(12) United States Patent
Numata et al.

(10) Patent No.: US 8,542,298 B2
(45) Date of Patent: Sep. 24, 2013

(54) IMAGE PROCESSING DEVICE AND IMAGE PROCESSING METHOD

(76) Inventors: Satoshi Numata, Tokyo (JP); Takashi Ogasawara, Kanagawa (JP)

(*) Notice: Subject to any disclaimer, the term of this patent is extended or adjusted under 35 U.S.C. 154(b) by 51 days.

(21) Appl. No.: 13/312,085

(22) Filed: Dec. 6, 2011

(65) Prior Publication Data

US 2012/0169892 A1    Jul. 5, 2012

(30) Foreign Application Priority Data

Jan. 5, 2011 (JP) .................................. 2011-000350

(51) Int. Cl.
*H04N 5/228* (2006.01)
*H04N 5/217* (2011.01)

(52) U.S. Cl.
USPC ........................................ 348/241; 348/208.2

(58) Field of Classification Search
USPC .................. 348/208.99, 208.1, 208.2, 208.4, 348/208.6, 241
See application file for complete search history.

(56) References Cited

U.S. PATENT DOCUMENTS

2010/0157072 A1* 6/2010 Luo et al. .................. 348/208.4

FOREIGN PATENT DOCUMENTS

JP    2009-290827    12/2009

OTHER PUBLICATIONS

U.S. Appl. No. 13/312,227, filed Dec. 6, 2011, Numata, et al.
U.S. Appl. No. 13/312,187, filed Dec. 6, 2011, Numata.
U.S. Appl. No. 13/309,774, filed Dec. 2, 2011, Numata, et al.

* cited by examiner

*Primary Examiner* — Timothy J Henn
(74) *Attorney, Agent, or Firm* — Sony Corporation

(57) ABSTRACT

There is provided an imaging device including a detection section which detects motion of the image processing device, a blend ratio calculation section which calculates a blend ratio of a first motion compensation image to a second motion compensation image, the first motion compensation image and the second motion compensation image being determined from a first motion vector and a second motion vector each indicating motion between frames, respectively, based on the motion of the image processing device detected by the detection section, a blend section which generates a motion compensation image by blending the first motion compensation image and the second motion compensation image in accordance with the blend ratio calculated by the blend ratio calculation section, and an addition section which adds the motion compensation image generated by the blend section to a target image.

10 Claims, 16 Drawing Sheets

(A) SUCCESSIVELY SHOT IMAGES

P1  P2  P3

COMPOSITE IMAGES AFTER MOTION COMPENSATION (B) NOISE-REDUCED IMAGE

Pmix

| OPERATION MODE | GLOBAL MOTION VECTOR | GMCBLEND RATIO |
|---|---|---|
| NORMAL SHOOTING | REAL TIME CALCULATION (TWO-FRAME DELAY) | CALCULATED IN ACCORDANCE WITH SHAKING |
| FIXED SHOOTING | NOT NEWLY CALCULATED | HIGH |

(IMAGE AFTER COMPOSITING)
=(1−ADDITION RATIO α·P)(TARGET IMAGE)+(ADDITION RATIO α·P)(MC IMAGE)
(EXAMPLE)

IMAGE PROCESSING DEVICE AND IMAGE PROCESSING METHOD

BACKGROUND

The present disclosure relates to an image processing device and an image processing method, and particularly to an image processing device and an image processing method which reduce noise included in an image.

In shooting an image, there is known technology for obtaining an image with reduced noise by compositing successively-shot multiple images (frames). For example, in the case where, on an image to be processed (target image), multiple images (reference images) are composited, which are shot successively before or after the shooting of the target image and are aligned by motion estimation and motion compensation, images which are almost the same as each other are integrated in a time direction. Accordingly, the noise randomly included in each image is cancelled out, and hence is reduced as a result. Hereinafter, the noise reduction (NR) achieved by such a method is referred to as frame NR.

In the past, a local motion vector with respect to a target block which is set within a target image has been estimated, and using the estimated local motion vector, global motion which represents the change applied to the entire images, between two images has been calculated. The global motion normally represents motion and amount of motion of a background as a still image part of an image.

As technology using the global motion, there is disclosed, for example, technology involving separating a background still image part and a moving subject-of-shooting part within an image, generating a motion compensation image (MC image) using a local motion vector which corresponds to a global motion vector generated from a global motion, and compositing the motion compensation image and a target image (for example, refer to JP 2009-290827A). In this technology, the MC image is generated using applicatively the global motion vector and the local motion vector, and compositing processing is performed.

In this technology, for example, when the reliability of the local motion vector is high, the compositing processing taking the moving subject-of-shooting into account can be performed, by using the MC image determined from the local motion vector. Further, in the case where the reliability of the local motion vector is low, the local motion vector is not used and the MC image determined from the global motion vector is used, thereby avoiding the generation of an MC image that is indeterminate as to whether the image includes a moving subject-of-shooting or noise, and hence, stable compositing processing can be performed.

SUMMARY

However, in the case of using the technology described above, when a global motion vector was to be calculated from multiple images, there was an issue that the global motion vector was not uniquely determined in the case where there were small number of feature points within the images, for example. Further, there was an issue that the global motion vector was not uniquely determined in the case where there were multiple motions different from each other were included within the image, for example.

Further, in general, the global motion vector changes rapidly when shooting scenes are switched or when a shooting range is enlarged or reduced, for example. There was an issue that, since there is a difference in apparent noise between an image using many global motion vectors and an image using many local motion vector, there was a high possibility that a user felt uncomfortable when the switching is performed between those images along the way. In particular, in the case of performing image processing to a moving image, since there is attached great importance to the continuity of one frame to another, when NR strengths differ from frame to frame, unnatural impression is imposed on the user more than in the case of not performing the NR processing.

In light of the foregoing, it is desirable to provide an image processing device and an image processing method which are novel and improved, and which are capable of, in an image processing device taking account of a global motion vector, obtaining stable NR effects regardless of variation in reliability of the global motion vector, and also avoiding the occurrence of unnatural NR effects even in the case where the global motion vector changes rapidly.

According to an embodiment of the present disclosure, there is provided an image processing device which includes a detection section which detects motion of the image processing device, a blend ratio calculation section which calculates a blend ratio of a first motion compensation image to a second motion compensation image, the first motion compensation image and the second motion compensation image being determined from a first motion vector and a second motion vector each indicating motion between frames, respectively, based on the motion of the image processing device detected by the detection section, a blend section which generates a motion compensation image by blending the first motion compensation image and the second motion compensation image in accordance with the blend ratio calculated by the blend ratio calculation section, and an addition section which adds the motion compensation image generated by the blend section to a target image.

The second motion compensation image may be a motion compensation image determined based on a frame obtained by being delayed one frame or more with respect to a frame used for determining the first motion compensation image.

The first motion vector may be a vector calculated for each block set within the frame.

The second motion vector may be a vector calculated for each frame.

The detection section may detect the motion of the image processing device by detecting movement of the image processing device.

The detection section may detect the motion of the image processing device by detecting connection of a fixing member to the image processing device.

According to another embodiment of the present disclosure, there is provided an image processing method which includes detecting motion of an image processing device, calculating a blend ratio of a first motion compensation image to a second motion compensation image, the first motion compensation image and the second motion compensation image being determined from a first motion vector and a second motion vector each indicating motion between frames, respectively, based on the motion of the image processing device, generating a motion compensation image by blending the first motion compensation image and the second motion compensation image in accordance with the blend ratio, and adding the motion compensation image to a target image.

According to the embodiments of the present disclosure described above, in the image processing device taking account of a global motion vector, it becomes possible to obtain stable NR effects regardless of variation in reliability of the global motion vector, and also to avoid the occurrence of unnatural NR effects even in the case where the global motion vector changes rapidly.

DETAILED DESCRIPTION OF THE EMBODIMENT(S)

Figure 1:
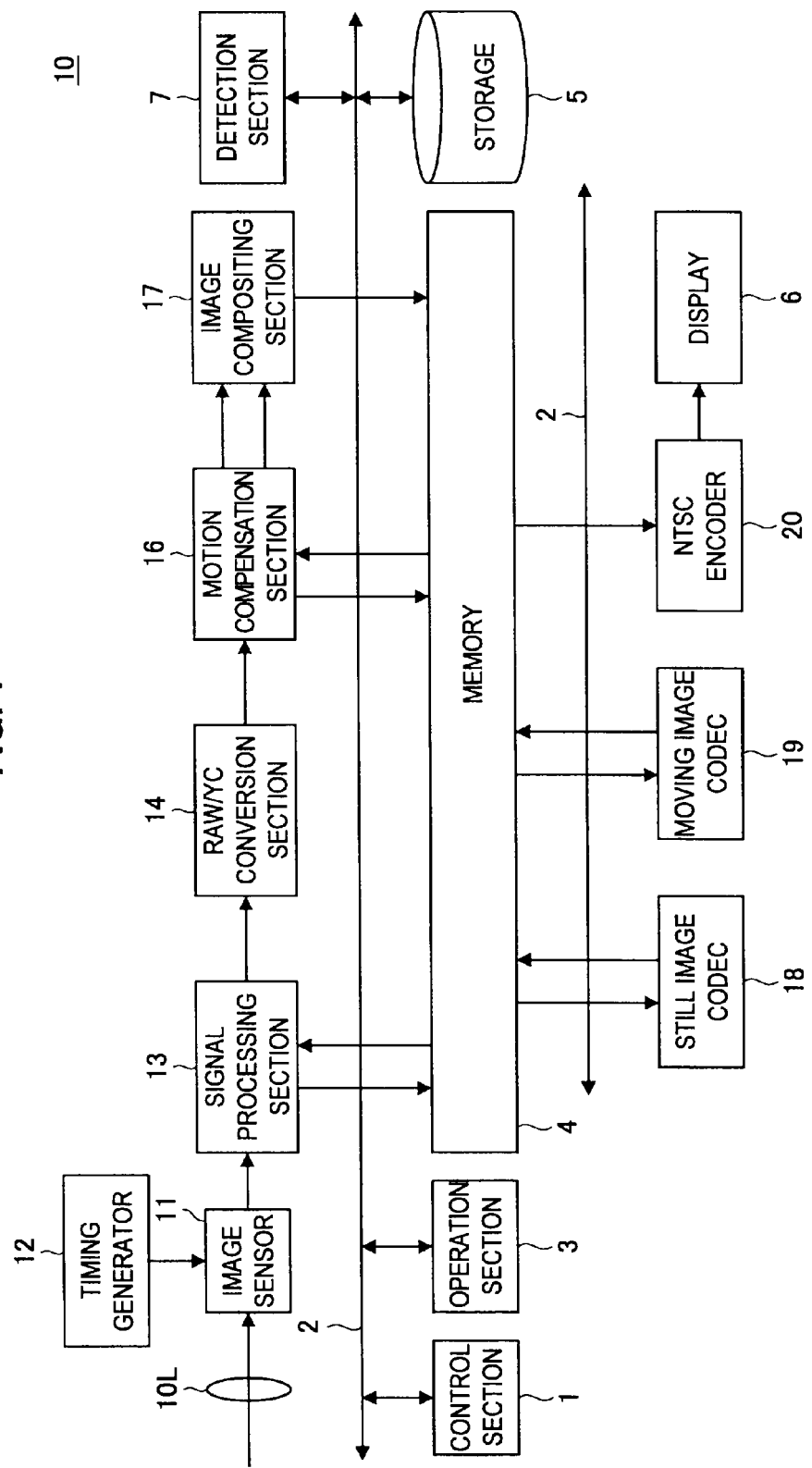
FIG. 1 is a block diagram showing a functional configuration of an imaging device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Embodiment
 1-1. Overall configuration of imaging device
 1-2. About frame NR processing
 1-3. Details of frame NR processing
2. Summary 1. Embodiment <1-1. Overall Configuration of Imaging Device>

First, a configuration of an imaging device according to an embodiment of the present disclosure will be described. In the embodiment of the present disclosure, the imaging device corresponds to an example of the image processing device.

FIG. 1 is a block diagram showing a functional configuration of an imaging device 10 according to the embodiment of the present disclosure. The imaging device 10 has a function of capturing a still image or a moving image and recording the captured still image or moving image in a recording medium as digital image data. The imaging device 10 may be any electronic device such as a digital camera.

Referring to FIG. 1, the imaging device 10 includes a control section 1, an operation section 3, a memory 4, a storage 5, an imaging optical system 10L, a timing generator 12, an image sensor 11, a signal processing section 13, an RAW/YC conversion section 14, a motion compensation section 16, an image compositing section 17, a still image codec 18, a moving image codec 19, an NTSC encoder 20, a detection section 7, and a display 6. Those respective structural elements are connected to one another via a system bus 2.

The control section 1 controls operation of each section of the imaging device 10. The control section 1 may be a CPU (Central Processing Unit) which operates based on a program stored in the memory 4 and thereby executing various types of arithmetic processing necessary for the control. The control section 1 may use the memory 4 as a temporary storage area for the arithmetic processing. Note that the program used for the control section 1 to operate may be a program that is written in the memory 4 in advance, or may be a program that is provided to the imaging device 10 by being stored in a disk-like recording medium or a removable storage medium such as a memory card. Further, the program used for the control section 1 to operate may be downloaded to the imaging device 10 via a network such as a LAN (Local Area Network) or the Internet.

The operation section 3 functions as a user interface for operating the imaging device 10. The operation section 3 may be, for example, an operation button such as a shutter button, which is provided on the exterior of the imaging device 10, a touch panel, or a remote controller. The operation section 3 may, based on an operation performed by a user, output to the control section 1 an operation signal for activation and stop of the imaging device 10, start and end of shooting a still image or a moving image, settings of various types of functions of the imaging device 10, or the like.

In the memory 4, data on processing of the imaging device 10 may be stored. The memory 4 may be, for example, a semiconductor memory such as a flash ROM (Read Only Memory) or a DRAM (Dynamic Random Access Memory). In the memory 4, for example, a program used by the control section 1 and an image signal processed by an image processing function are temporarily or continuously stored. The image signal stored in the memory 4 may be, for example, a target image and a reference image of a base frame and a reduced frame, and an NR image, to be described below.

In the storage 5, an image shot by the imaging device 10 is stored as image data. The storage 5 may be, for example, a semiconductor memory such as a flash ROM, an optical disc such as a BD (Blu-ray Disc), a DVD (Digital Versatile Disc), or a CD (Compact Disc), or a hard disk. The storage 5 may also be a storage device built into the imaging device 10, or be a removable medium such as a memory card that is detachable to and from the imaging device 10.

The imaging optical system 10L is formed of various types of lenses such as a focus lens and a zoom lens, and optical components such as an optical filter and a diaphragm. An optical image (image of subject-of-shooting) entered from the subject-of-shooting is formed into an image on an exposure surface of the image sensor 11 via each optical component of the imaging optical system 10L.

The timing generator 12 generates, in accordance with an instruction given by the control section 1, various types of pulses such as a four-phase pulse and a field shift pulse for vertical transmission and a two-phase pulse and a shutter pulse for horizontal transmission, and supplies the image sensor 11 with the pulses.

The image sensor 11 is configured from, for example, a solid-state image sensor such as a CCD (Charge Coupled Device) or a CMOS (Complementary Metal Oxide Semiconductor). The image sensor 11 is driven by an operation pulse from the timing generator 12, and performs photoelectric conversion of the image of subject-of-shooting guided through the imaging optical system 10L. In this way, the image signal that represents the picked-up image is output to the signal processing section 13. The image signal that is output here is a signal which is synchronized with the operation pulse supplied from the timing generator 12, and is a RAW signal (raw signal) of a Bayer array including the three primary colors of red (R), green (G), and blue (B).

The image processing function of each section performed in the signal processing section 13 and after that may be realized by using a DSP (Digital Signal Processor), for example. The signal processing section 13 executes, to the image signal input from the image sensor 11, image signal processing such as noise reduction, white balance adjustment, color correction, edge reinforcement, gamma correction, and resolution conversion. The signal processing section 13 may temporarily store a digital image signal in the memory 4. The RAW/YC conversion section 14 converts the RAW signal input from the signal processing section 13 into a YC signal, and outputs the YC signal to the motion compensation section 16. Here, the YC signal is an image signal including a luminance component (Y) and a red/blue color-difference component (Cr/Cb).

The motion compensation section 16 loads an image signal of a target image and an image signal of a reference image from the memory 4. The motion compensation section 16 estimates a motion vector between those images (local motion vector LMV) by processing such as block matching, and compensates the motion between the target image and the reference image. Further, the motion compensation section 16 evaluates a degree of correspondence of background for a target block, and generates a hit ratio β. In this embodiment, the target image, the motion compensation image, and the hit ratio β are output from the motion compensation section 16 to the image compositing section 17.

The image compositing section 17 composites the target image and the motion compensation image based on the hit ratio β, and generates an NR image as a result of the compositing. In the NR image, the noise included in the image is reduced owing to the effect achieved by the frame NR described above. Note that the details of the motion compensation section 16 and the image compositing section 17 will be described below.

In the case where an instruction to shoot a still image is acquired by the operation section 3 (at the time of shooting the still image), the still image codec 18 loads from the memory 4 the image signal obtained after the NR processing, compresses the image signal with a predetermined compression coding system such as JPEG (Joint Photographic Experts Group), and stores the compressed image signal in the storage 5 as image data. Further, in the case where an instruction to reproduce the still image is acquired by the operation section 3 (at the time of reproducing the still image), the still image codec 18 may load the image data from the storage 5, and may provide the NTSC encoder 20 with the image signal expanded with a predetermined compression coding system such as JPEG.

In the case where an instruction to shoot a moving image is acquired by the operation section 3 (at the time of shooting the moving image), the moving image codec 19 loads from the memory 4 the image signal obtained after the NR processing, compresses the image signal with a predetermined compression coding system such as MPEG (Moving Picture Experts Group), and stores the compressed image signal in the storage 5 as image data. Further, in the case where an instruction to reproduce the moving image is acquired by the operation section 3 (at the time of reproducing the moving image), the moving image codec 19 may load the image data from the storage 5, and may provide the NTSC encoder 20 with the image signal expanded with a predetermined compression coding system such as MPEG.

The NTSC (National Television System Committee) encoder 121 converts the image signal into an NTSC system standard color video signal, and provides the display 6 with the NTSC system standard color video signal. At the time of shooting the still image or at the time of shooting the moving image, the NTSC encoder 20 may load from the memory 4 the image signal obtained after the NR processing, and may provide the display 6 with the image as a through image or a shot image. Further, at the time of reproducing the still image or at the time of reproducing the moving image, the NTSC encoder 20 may acquire the image signal from the still image codec 18 or the moving image codec 19, and may provide the display 6 with the image signal as a reproduced image.

The display 6 displays a video signal acquired from the NTSC encoder 20. The display 6 may be, for example, an LCD (Liquid Crystal Display) or an organic EL (Electro-Luminescence) display. Further, the video signal output from the NTSC encoder 20 may be output to an outside from the imaging device 10, using a communication section such as an HDMI (High-Definition Multimedia Interface), which is not shown.

The detection section 7 functions as a detection device for detecting a motion of the imaging device 10. The detection section 7 may, for example, detect the motion of the imaging device 10 by detecting the connection state with a fixing member which is for fixing the imaging device 10 thereto, or may detect the motion of the imaging device 10 by detecting a predetermined movement of the imaging device 10 using a sensor (such as a acceleration sensor or a gyro sensor) which is built into the imaging device 10. The detection section 7 may output the signal obtained by the detection to the control section 1 as a detection signal.

<1-2. About Frame NR Processing>

Next, frame NR processing according to the embodiment of the present disclosure will be described. In the imaging device 10 according to the present embodiment, the frame NR processing is mainly executed by the motion compensation section 16 and the image compositing section 17.

As described above, in the imaging device 10, the RAW signal generated by sensor coding performed by the image sensor 11 is converted into a YC signal by the RAW/YC conversion section 14. The frame NR is generally performed with respect to the RAW signal. However, for the frame NR with respect to the RAW signal, an extremely large amount of system resource within the imaging device 10 is used. Accordingly, in the present embodiment, the amount of system resource used for the frame NR is suppressed by performing the frame NR to the YC signal.

Figure 2:
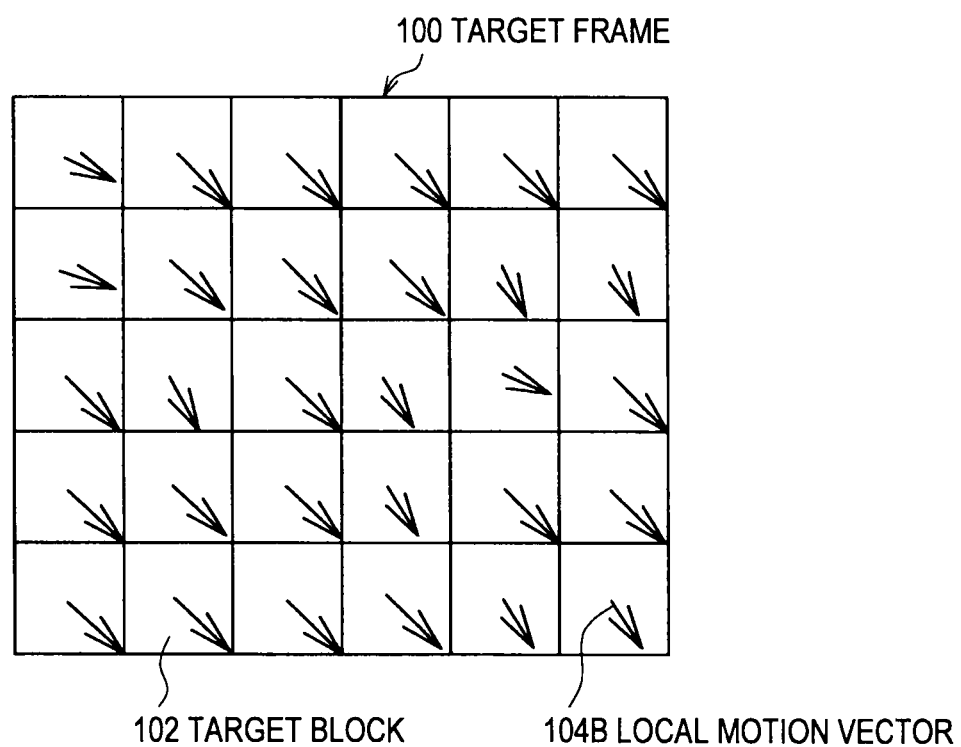
FIG. 2 is an explanatory diagram on block matching according to the embodiment of the present disclosure.

FIG. 2 is an explanatory diagram on block matching according to the embodiment of the present disclosure. In this embodiment, as shown in FIG. 2, a target frame 100 is divided into multiple target blocks 102 each having relatively small size, for example, 64 pixels×64 lines. Then, a motion vector (local motion vector) 104B for each of those multiple target blocks is determined first. At this time, in this embodiment, an index indicating the reliability of each determined local motion vector is also calculated.

After that, based on the index of the reliability of the local motion vector, only local motion vectors each having high reliability is extracted out of multiple local motion vectors determined for respective target frames. Next, only from the extracted local motion vectors each having high reliability, a global motion is calculated. Then, with the use of the calculated global motion, a global motion vector on a per-target block basis is calculated. However, in this embodiment, a technique for calculating the global motion vector is not particularly limited.

Then, the calculated global motion vector is compared with the local motion vector for each target block, and based on the comparison result, whether each target block is a background part or a moving subject-of-shooting part is evaluated and determined. In this embodiment, the calculated global motion vector is compared with the local motion vector for each target block, and the degree of correspondence between the two is determined. After that, as the determination result thereof, an index value which indicates the degree of correspondence between the local motion vector and the global motion vector for each target block is calculated. The index value is referred to as hit ratio in this specification.

In the embodiment, with the use of two output motion vectors (local motion vector and global motion vector) on a per-target block basis, an alignment of a reference frame on a block-by-block basis is performed with respect to the target frame, thereby generating two motion compensation images (motion compensation frames) (local motion compensation image and global motion compensation image). Then, an NR image is generated by compositing the target frame and the two motion compensation frames.

In the embodiment, it is not that either of the motion compensation image determined using the local motion vector (local MC image, hereinafter may be simply referred to as "LMC") or the motion compensation image determined using the global motion vector (global MC image, hereinafter may be simply referred to as "GMC") is used, and it is that the two motion compensation images are blended and used based on the information from the control section 1 (for example, CPU).

Figure 3:
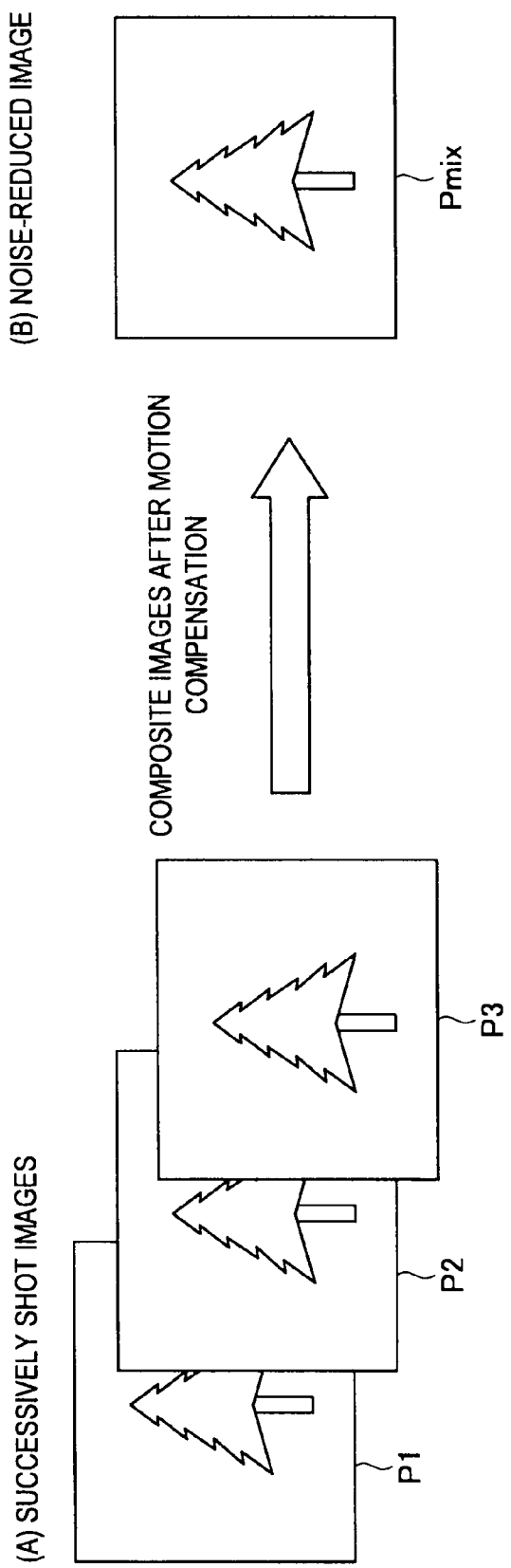
FIG. 3 is a conceptual diagram of frame NR processing according to the embodiment of the present disclosure.

FIG. 3 is a conceptual diagram of frame NR processing according to the embodiment of the present disclosure. Referring to FIG. 3, in the frame NR processing according to the present embodiment, successively-shot multiple images P1 to P3 are composited after being aligned (motion compensation), and form a noise-reduced image Pmix. Note that, as described above, the reason why the noise is reduced when the successively-shot multiple images are composited is that almost the same images are integrated in the time direction, and the noise randomly included in each image is cancelled out.

In the example shown in the figure, the multiple images P1 to P3 to be composited are not necessarily three images, and may be two images or four or more images. For example, in the case where the imaging device 10 according to the present embodiment shoots a still image, out of the multiple images which are successively shot at high speed, the first image may be used as a target image, and the second and the following images, which are used as reference images, may be composited on the target image. Further, in the case where the imaging device 10 shoots a moving image, images of successive frames which are sequentially shot may each be used as a target image, and onto those target images, the images of the frames that are immediately before the respective target images may be composited as reference images. That is, an image of a certain frame may be used as a target image, and may also be used as a reference image in the case of using an image of another frame as the target image.

In this way, in the processing of frame NR in which successively-shot images are composited, the alignment (motion compensation) between the target image and the reference image to be composited becomes important. In those images, there is a case where misregistration of an image occurs due to shaking of a shooter's hand, for example. Further, in each image, there is also a case where the misregistration occurs due to the movement of the subject-of-shooting itself. Accordingly, in the frame NR of the present embodiment, for each of multiple target blocks generated by dividing the target image, a motion vector on a per-block basis is estimated. In addition, for each block, motion compensation in which the motion vector on a per-block basis is reflected is performed, and then the target image and the reference image are composited.

Here, in the processing of estimating the motion vector on a per-block basis, there is used a block matching method, for each block (target block) of the target image, for searching for a block (motion compensation block) having the highest correlation therewith from among blocks (reference blocks) of the reference image. The motion vector on a per-block basis is determined as misregistration between the target block and the motion compensation block. The degree of correlation between the target block and the reference block may be evaluated using a SAD (Sum of Absolute Difference) value of luminance values of pixels within the respective blocks, for example.

Figure 4:
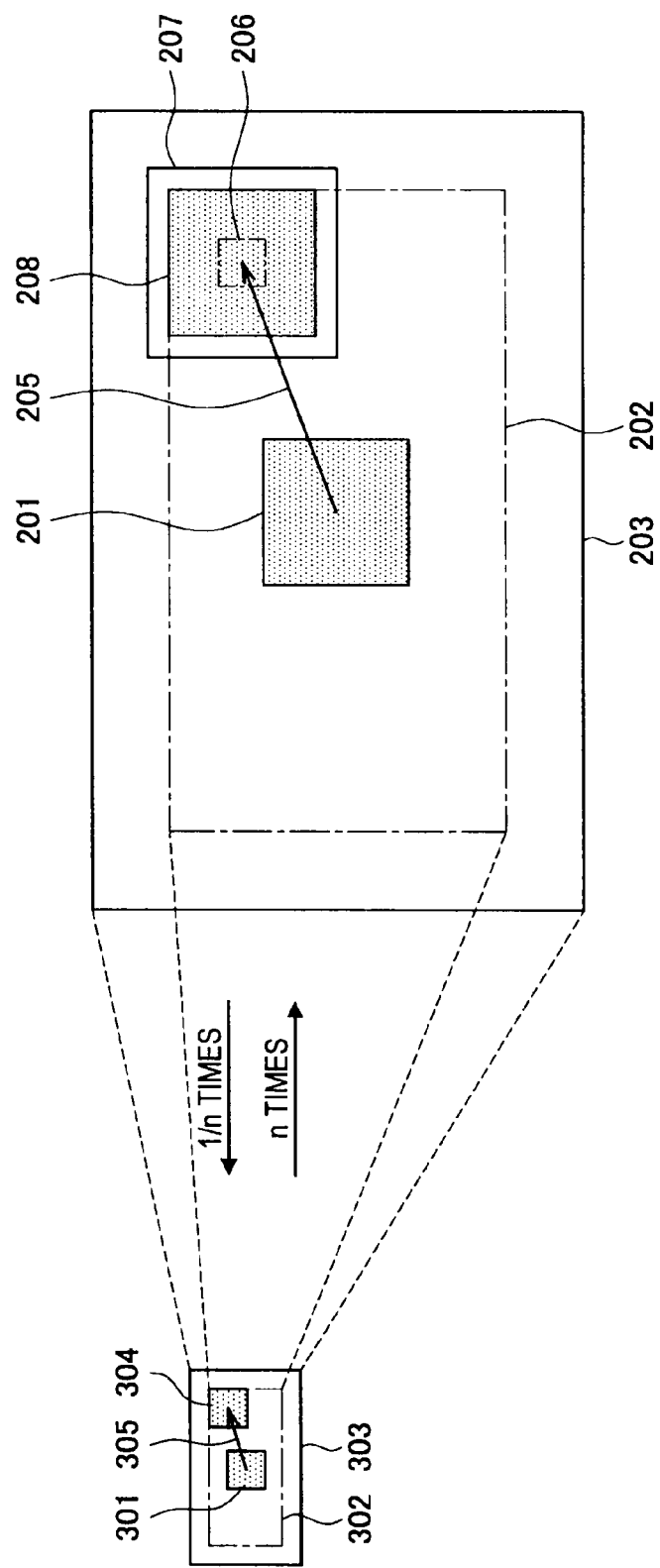
FIG. 4 is an explanatory diagram on motion vector estimation processing according to the embodiment of the present disclosure.

FIG. 4 is an explanatory diagram on motion vector estimation processing according to the embodiment of the present disclosure. Referring to FIG. 4, in the motion vector estimation processing according to the present embodiment, the motion vector on the reduced frame is estimated first, and, based on the result thereof, the motion vector on the base frame is estimated.

In the processing for estimating the motion vector on a per-block basis, the reference block having the minimum SAD value is specified as a motion compensation block. That is, in order to specify the motion compensation block, it is necessary to search for the reference block having the minimum SAD value, while sequentially moving the position of the reference block. For example, in the case of attempting to estimate the motion vector having an accuracy of 1 pixel, it is necessary that the motion compensation block be specified at an accuracy of 1 pixel, and therefore, also in searching for the reference block having the minimum SAD value, it is necessary that the reference block be sequentially moved by 1 pixel.

In the case where such reference block search is performed for the target image and the reference image as they are, the number of times of calculating the SAD values becomes too large, and the processing load increases. Accordingly, in the present embodiment, as shown in the example in the figure, images (reduced frames) obtained by reducing the respective target image and reference image are created, and based on the results obtained by estimating motion vectors on the reduced frames, motion vectors on the target image and the reference image (base frames), which are not reduced, are estimated.

Specifically, first, the target image and the reference image are each reduced to 1/n (n=2, 3, ... ) in the horizontal direction and in the vertical direction, and a reduced frame target image and a reduced frame reference image are created. Accordingly, a base frame target block 201, and a search range 202 and a matching processing range 203 which are set based on the projection image of the base frame target block 201 on the reference image, are each reduced to 1/n, and are formed into a reduced frame target block 301, a reduced frame search range 302, and a reduced frame matching processing range 303, respectively.

Next, in the reduced frame reference image, the SAD value between multiple reduced frame reference blocks 304 set within a reduced frame matching processing range 303 and a reduced frame target block 301 is calculated, and thereby specifying, as a reduced frame motion compensation block, the block having the highest correlation with the reduced frame target block 301 among the reduced frame reference blocks 304. In addition, the misregistration between the reduced frame target block 301 and the reduced frame motion compensation block is acquired as a reduced frame motion vector 305.

Next, in a base frame reference image, a base frame temporary motion vector 205 obtained by multiplying the reduced frame motion vector 305 by n is defined. In addition, in the vicinity of the position moved in the direction and distance indicated by the base frame temporary motion vector 205 from the projection image of the base frame target block 201 on the base frame reference image, a base frame search range 206 and a base frame matching processing range 207 are set. Subsequently, the SAD value between multiple base frame reference blocks 208 set within the base frame matching processing range 207 and the base frame target block 201 is calculated, and thereby specifying, as a base frame motion compensation block, the block having the highest correlation with the base frame target block 201 among the base frame reference blocks 208. In addition, the misregistration between the base frame target block 201 and the base frame motion compensation block is acquired as a base frame motion vector.

Here, since the reduced frame reference image is reduced to 1/n compared to the base frame reference image, the accuracy of the reduced frame motion vector 305 is n times lower than the accuracy of the motion vector determined by a similar search performed on the base frame. For example, in the case of attempting to obtain the motion vector by searching for the motion compensation block by sequentially moving the reference block by 1 pixel, although the accuracy of the motion vector obtained in the search of the base frame is 1 pixel, the accuracy of the motion vector obtained in the search of the reduced frame is n pixel.

Therefore, in the present embodiment, the base frame search range 206 and the base frame matching processing range 207 are set on the base frame reference image based on the reduced frame motion vector 305 obtained in searching the reduced frame, and the searches of the motion compensation block and the motion vector are executed at a desired accuracy. Although the accuracy is lowered by n times, the range that the motion compensation block may be present is specified by the reduced frame motion vector 305. Accordingly, the range of the search performed on the base frame may be the base frame search range 206, which is much smaller than the original search range 202. For example, in the example shown in the figure, in the case of attempting to obtain a motion vector in unit of 1 pixel by the search of the base frame, the base frame search range 206 may have the range of n pixel(s) in the horizontal direction by n pixel(s) in the vertical direction.

In the motion vector estimation processing according to the present embodiment, the search of the motion compensation block in the entire original search range 202 is replaced with the search in the reduced frame search range 302. In this way, the number of times of calculating the SAD values of reference blocks is reduced to 1/n, for example, compared to the case where the calculation is executed with respect to the target image and the reference image as they are. Further, in the motion vector estimation processing according to the present embodiment, although an additional search in the base frame search range 206 is executed, the number of times of calculating the SAD values of reference blocks is not large in the additional search, since the base frame search range 206 represents a range much smaller than the original search range 202. Therefore, in the motion vector estimation processing according to the present embodiment, the processing load is reduced, compared to the case where the processing is executed with respect to the target image and the reference image as they are.

As has been described heretofore, in the frame NR processing according to the present embodiment, the noise of the image is reduced by compositing the successively-shot multiple images after the motion compensation. In the estimation of the motion vector for the motion compensation, the processing is executed with fewer loads, with the search using the reduced frame obtained by reducing the base frame.

Figure 5:
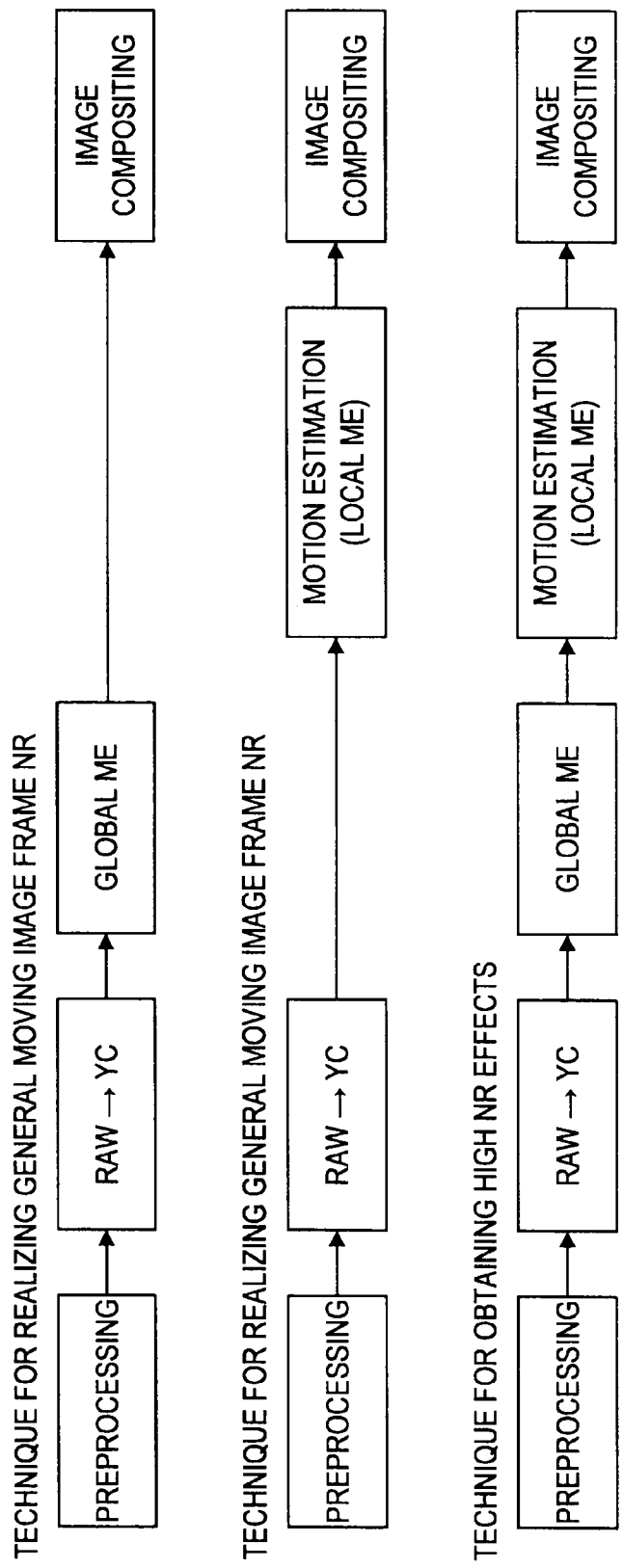
FIG. 5 is an explanatory diagram on techniques for realizing various types of moving image frame NR.

FIG. 5 is an explanatory diagram on techniques for realizing various types of moving image frame NR. As shown in FIG. 5, in a system for realizing the moving image frame NR, the following techniques are generally used: a technique involving performing global motion estimation (global ME) for calculating a global motion vector, creating a motion compensation image using the global motion vector, and performing frame addition; and a technique involving performing local motion estimation (local ME) for calculating a local motion vector, creating a motion compensation image using the local motion vector, and performing frame addition.

For example, since it is difficult that the frame NR using the global motion vector creates a correct motion compensation image regarding a moving subject-of-shooting part within the frame, it is difficult to obtain NR effects for the moving subject-of-shooting part. On the other hand, since the frame NR using the local motion vector can create a motion compensation image regarding a moving subject-of-shooting part within the frame owing to the local ME, NR effects can be obtained for the entire screen.

Further, it is difficult that the frame NR using the local motion vector creates a correct motion compensation image regarding a part of the image having a small number of feature points, such as a background, because the local motion vector is given to an unstable element such as noise, therefore, it is difficult to expect high NR effects. On the other hand, the frame NR using the global motion vector can generate a motion compensation image regardless of local presence or absence of the feature point, and NR effects can also be obtained regarding the part of the image having a small number of feature points, such as a background.

Accordingly, as a technique for obtaining high NR effects regarding both the moving subject-of-shooting part and the part of the image having a small number of feature points, such as a background, there is given a technique in which the global motion estimation (global ME) for calculating a global motion vector and the local motion estimation (local ME) for calculating a local motion vector are performed.

The global motion vector calculation described here may be performed by signal processing using image information between multiple frames, or may be performed based on information other than image information, such as information obtained by using a gyro device or the like.

Figure 6:
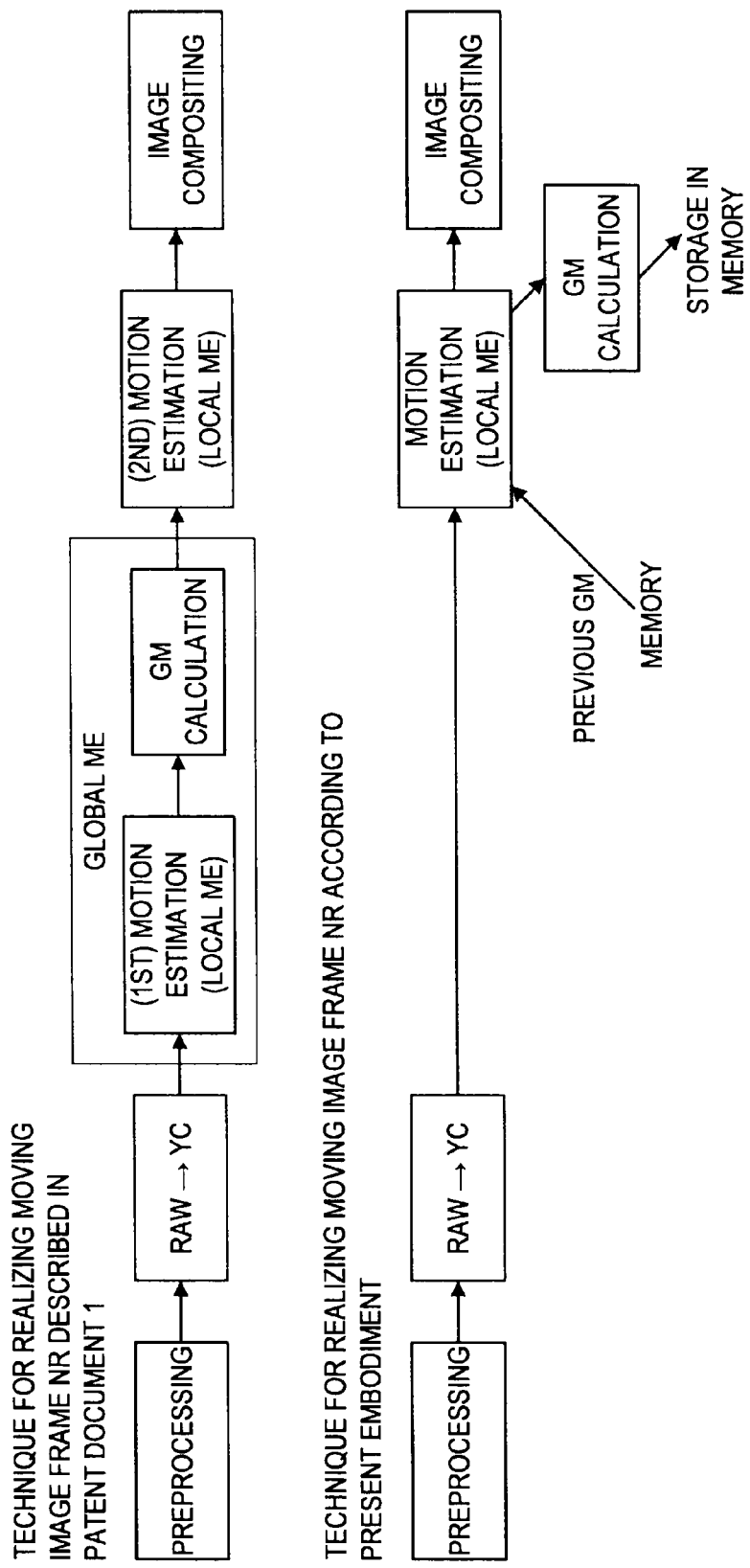
FIG. 6 is an explanatory diagram on techniques for realizing moving image frame NR according to the embodiment of the present disclosure.

FIG. 6 is an explanatory diagram on techniques for realizing moving image frame NR according to the embodiment of the present disclosure. As shown in FIG. 6, in a system for realizing the moving image frame NR taking account of a global motion vector, there is a technique in which two types of motion estimation (ME), the local motion estimation (local ME) for calculating a local motion vector and the global motion estimation (global ME) for calculating a global motion vector, are performed. For example, there is suggested in the technique for realizing the moving image frame NR as shown in JP 2009-290827A, 1st ME (pre-ME) and 2nd ME (main ME) are defined for performing the local ME and the global ME, and the local ME is performed twice with respect to the same image.

Such a technique can be applied to the still image shooting, but when attempting to apply the technique to a moving image system in which images are flowing from the former stage to the latter stage, it becomes necessary to prepare two motion estimation circuits for performing ME twice with respect to the same image. The amount of resource consumed for the motion estimation circuit is enormous, and there have been given various suggestions for reducing the amount of resource in the past. However, there has been no suggestion for reducing the amount of resource in order to perform the global ME and the local ME on a real-time basis. According to the technique for realizing the moving image frame NR of the embodiment, it is possible to further solve another issue that the technique of realizing the general moving image frame NR has.

Specifically, a motion compensation image can be set as a second motion compensation image (for example, global MC image), the motion compensation image being determined based on a frame obtained by being delayed one frame or more with respect to the frame used for determining a first motion compensation image (for example, local MC image). Accordingly, the local moving image frame NR taking account of a global motion vector can be realized using the same configuration as a frame NR device realized by local ME of the past. More specifically, the local motion vector and the global motion vector can be calculated in one motion estimation circuit, and hence, the amount of resource for performing the global ME and the local ME on a real-time basis can be reduced.

<1-3. Details of Frame NR Processing>

Next, there will be described the details of frame NR processing according to the embodiment of the present disclosure, along with the detailed functions of the motion compensation section 16 and the image compositing section 17.

(Details of Motion Compensation Section)

Figure 7:
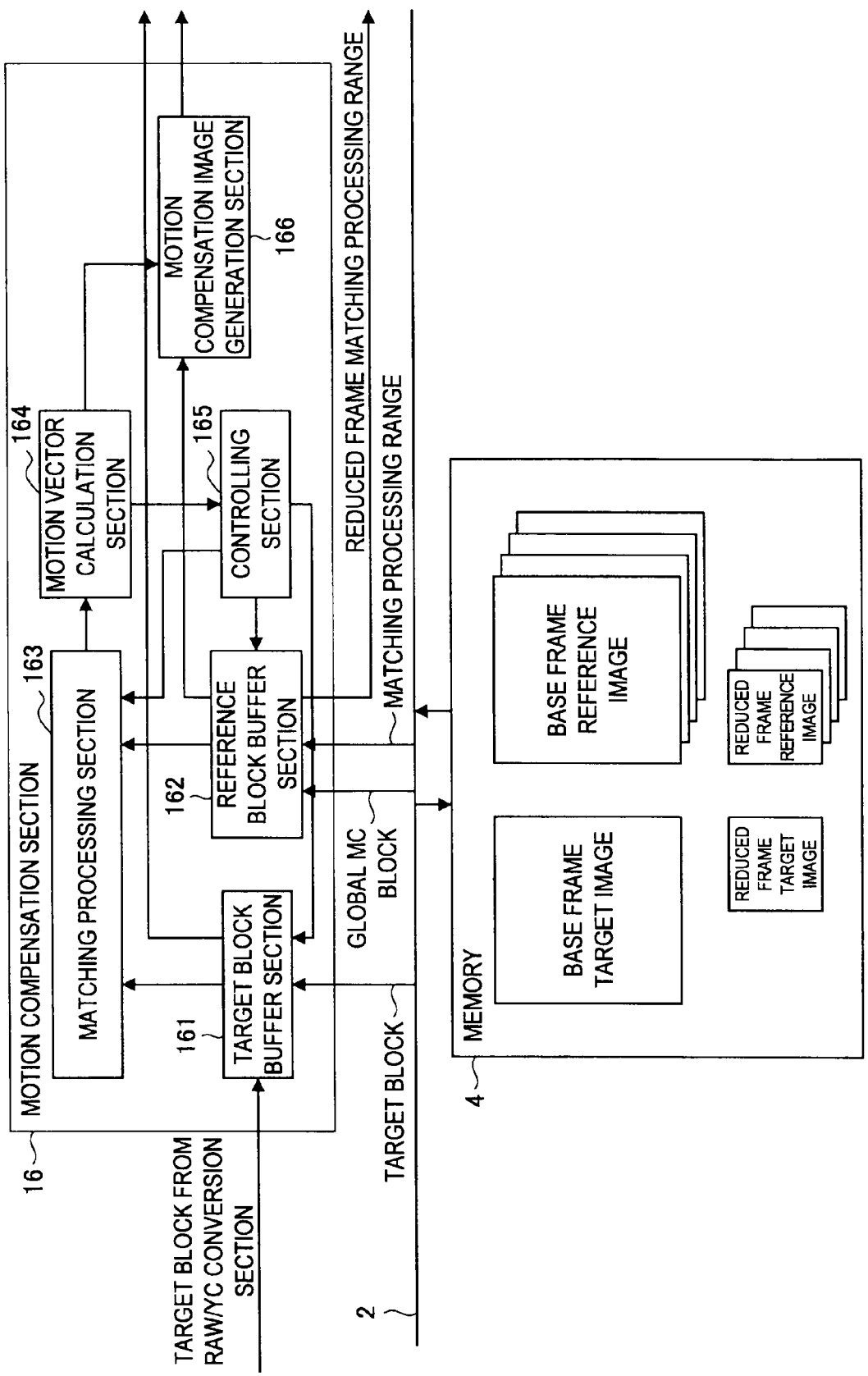
FIG. 7 is a block diagram showing a functional configuration of a motion compensation section of the imaging device according to the embodiment of the present disclosure.

FIG. 7 is a block diagram showing a functional configuration of the motion compensation section 16 of the imaging device 10 according to the embodiment of the present disclosure. Referring to FIG. 7, the motion compensation section 16 includes a target block buffer section 161, a reference block buffer section 162, a matching processing section 163, a motion vector calculation section 164, a controlling section 165, and a motion compensation image generation section 166. The motion compensation section 16 including those sections may be realized using a DSP, for example.

Figure 8:
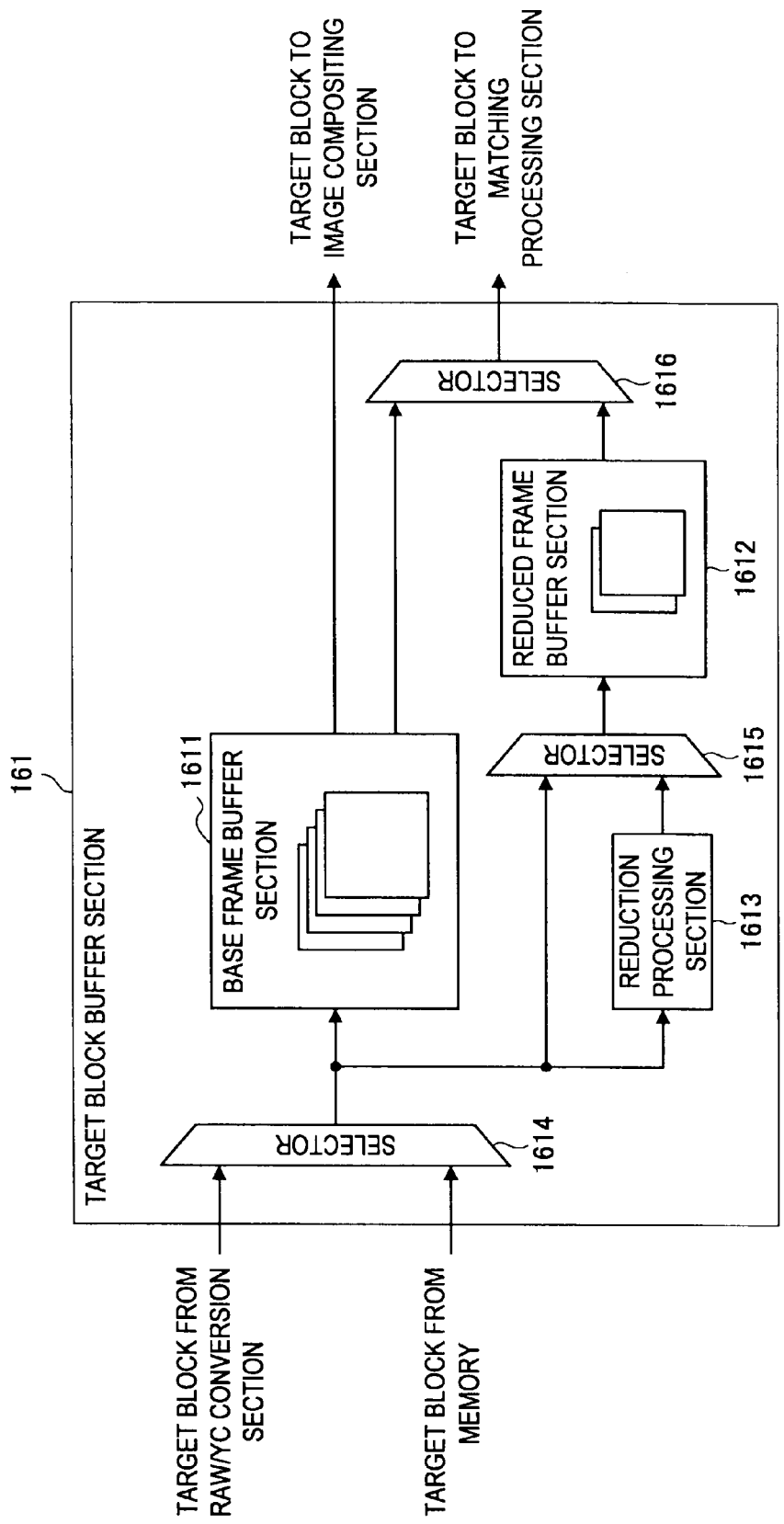
FIG. 8 is a block diagram showing a functional configuration of a target block buffer section included in the motion compensation section of the imaging device according to the embodiment of the present disclosure.

Here, with reference to FIG. 8, the target block buffer section 161 will be described. FIG. 8 is a block diagram showing a functional configuration of the target block buffer section 161 included in the motion compensation section 16 of the imaging device 10 according to the embodiment of the present disclosure. Referring to FIG. 8, the target block buffer section 161 includes a base frame buffer section 1611, a reduced frame buffer section 1612, and a reduction processing section 1613.

The target block buffer section 161 acquires pixel data of the base frame target block 201 or the reduced frame target block 301 provided by the memory 4 or the RAW/YC conversion section 14. The source from which those pieces of pixel data are acquired may be switched by a selector 1614. For example, the target block buffer section 161 may acquire the pixel data from the memory 4 when shooting a still image, and may acquire the pixel data from the RAW/YC conversion section 14 when shooting a moving image. Note that the pixel data of the reduced frame target block 301 acquired here may be generated by a reduced frame generation section 174 included in the image compositing section 17 to be described below or by the RAW/YC conversion section 14, and may be stored in the memory 4.

The target block buffer section 161 accumulates the pixel data of the base frame target block 201 in the base frame buffer section 1611. Further, the target block buffer section 161 accumulates the pixel data of the reduced frame target block 301 in the reduced frame buffer section 1612. For example, in the case where, at the time of shooting a moving image, the pixel data of the reduced frame target block 301 is not included in the pixel data acquired from the RAW/YC conversion section 14, the target block buffer section 161 uses the reduction processing section 1613 and generates the pixel data of the reduced frame target block 301 from the pixel data of the base frame target block 201. Whether or not to use the reduction processing section 1613 may be switched by a selector 1615.

The target block buffer section 161 provides the motion compensation image generation section 166 and the matching processing section 163 with the pixel data of the base frame target block 201 or the reduced frame target block 301. To the motion compensation image generation section 166, the pixel data of the base frame target block 201 accumulated in the base frame buffer section 1611 is provided. To the matching processing section 163, the pixel data of the reduced frame target block 301 accumulated in the reduced frame buffer section 1612 is provided at the time of block matching processing in the reduced frame, and the pixel data of the base frame target block 201 accumulated in the base frame buffer section 1611 is provided at the time of block matching processing in the base frame. The pixel data provided to the matching processing section 163 may be switched by a selector 1616.

Figure 9:
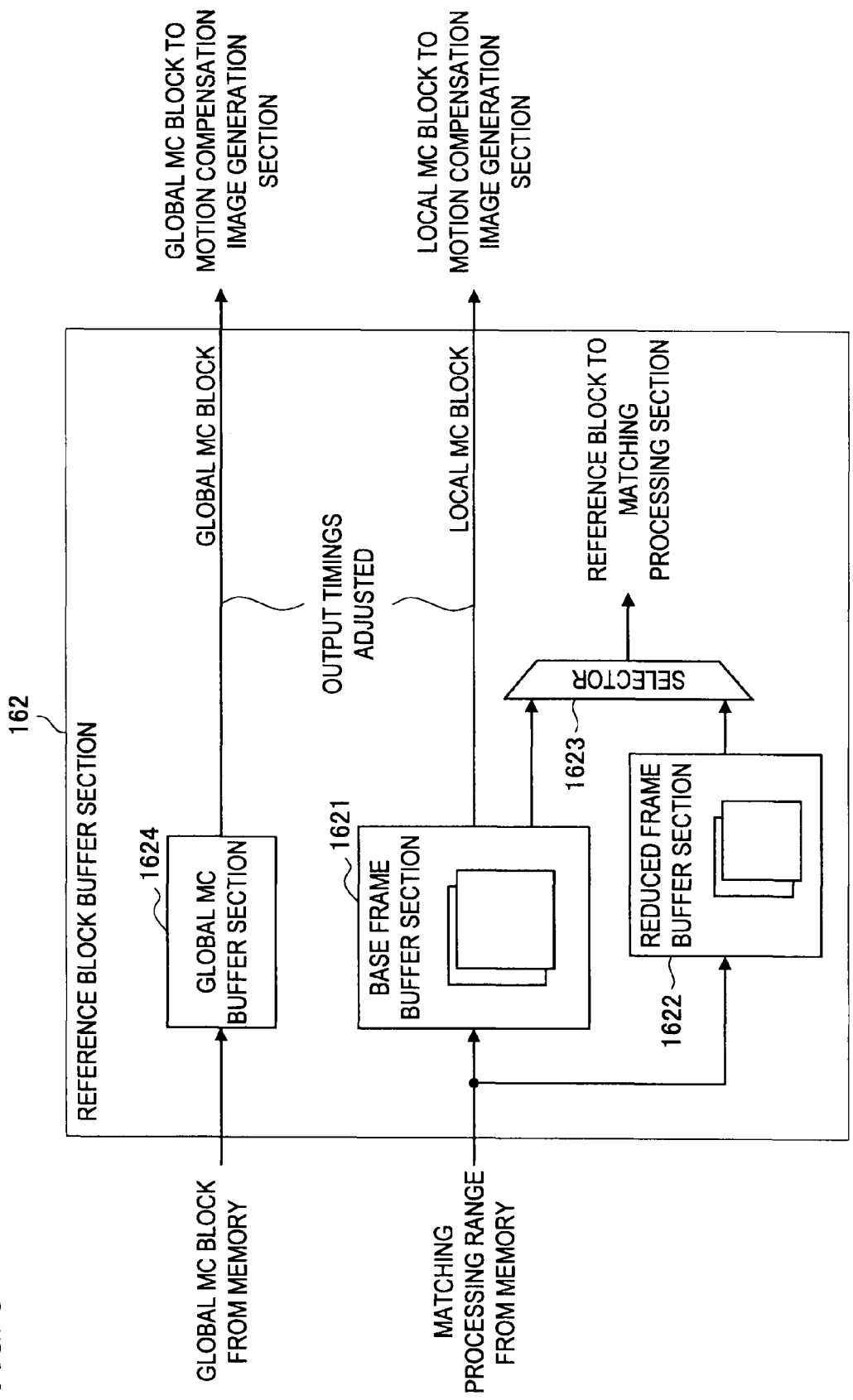
FIG. 9 is a block diagram showing a functional configuration of a reference block buffer section included in the motion compensation section of the imaging device according to the embodiment of the present disclosure.

Next, with reference to FIG. 9, the reference block buffer section 162 will be described. FIG. 9 is a block diagram showing a functional configuration of the reference block buffer section 162 included in the motion compensation section 16 of the imaging device 10 according to the embodiment of the present disclosure. Referring to FIG. 9, the reference block buffer section 162 includes a base frame buffer section 1621, a reduced frame buffer section 1622, a selector 1623, and a global MC buffer section 1624.

The reference block buffer section 162 acquires, from the memory 4, the pixel data of the reduced frame matching processing range and the pixel data of the base frame matching processing range. The pixel data of the reduced frame matching processing range and the pixel data of the base frame matching processing range that have been acquired are accumulated in the base frame buffer section 1621 and the reduced frame buffer section 1622, respectively.

Further, the reference block buffer section 162 provides the motion compensation image generation section 166 and the matching processing section 163 with the pixel data of the base frame or the reduced frame. To the motion compensation image generation section 166, out of the pieces of pixel data of the base frame matching processing range accumulated in the base frame buffer section 1621, the pixel data of the range specified as a motion compensation block is provided. At the time of block matching processing in the reduced frame, out of the pieces of pixel data of the reduced frame matching processing range accumulated in the reduced frame buffer section 1622, the pixel data of the reduced frame reference block used in the block matching processing is provided to the matching processing section 163. Further, at the time of block matching processing in the base frame, out of the pieces of pixel data of the base frame matching processing range accumulated in the base frame buffer section 1621, the pixel data of the base frame reference block used in the block matching processing is provided to the matching processing section 163. Note that the pixel data provided to the matching processing section 163 is switched by a selector 1623.

The global MC buffer section 1624 acquires a global MC block (motion compensation block obtained by motion-compensating a reference block based on a global motion vector) from the memory 4. The global MC block corresponds to "previous GM" shown in FIG. 6. The acquired global MC block is output to the motion compensation image generation section 166. Here, the controlling section 165 performs control such that the timing at which the global MC buffer section 1624 outputs the global MC block is adjusted to coincide with the timing at which the base frame buffer section 1621 outputs a local MC block (motion compensation block obtained by motion-compensating a reference block based on a local motion vector).

Refer to FIG. 7 again. The matching processing section 163 executes block matching processing for detecting strength of correlation between a target block and a reference block. The strength of correlation between the target block and the reference block may be evaluated using a SAD value of a luminance signal of each pixel, for example. The strength of correlation between the target block and the reference block may also be evaluated using another piece of information, such as a color-difference signal of each pixel. Further, in order to cut down the amount of operation, some of the pixels to be operated may be skipped.

The motion vector calculation section 164 calculates, as a local motion vector, a motion of the reference image with respect to the target image for each target block. Specifically, for example, the motion vector calculation section 164 acquires a local motion vector based on the result obtained by the block matching processing performed in the matching processing section 163. The motion vector calculation section 164 detects and holds the minimum value of the SAD value calculated by the matching processing section 163, and in addition, may hold the SAD values of multiple reference blocks which are placed in the vicinity of the reference block having the minimum SAD value, and may estimate a local motion vector with high sub-pixel accuracy by quadratic curve approximate interpolation processing, for example.

Further, the motion vector calculation section 164 calculates an index value which indicates the degree of correspondence between the local motion vector and the global motion vector for each target block. Specifically, for example, the motion vector calculation section 164 evaluates a degree of correspondence of background for a target block, and generates a hit ratio β. From the motion vector calculation section 164, the hit ratio β is output to the image compositing section 17. Further, the motion vector calculation section 164 calculates a global motion vector, and stores the calculated global motion vector in the memory 4. The global motion vector stored in the memory 4 here is used in the next motion estimation (local ME) shown in FIG. 6.

The controlling section 165 controls each section included in the motion compensation section 16. For example, the controlling section 165 controls the selectors 1614 to 1616 included in the target block buffer section 161, and the selector 1623 included in the reference block buffer section 162. Further, the controlling section 165 may also control the matching processing section 163 such that the block matching processing in the reduced frame or the base frame is executed based on the pixel data provided by the target block buffer section 161 and the reference block buffer section 162.

Figure 10:
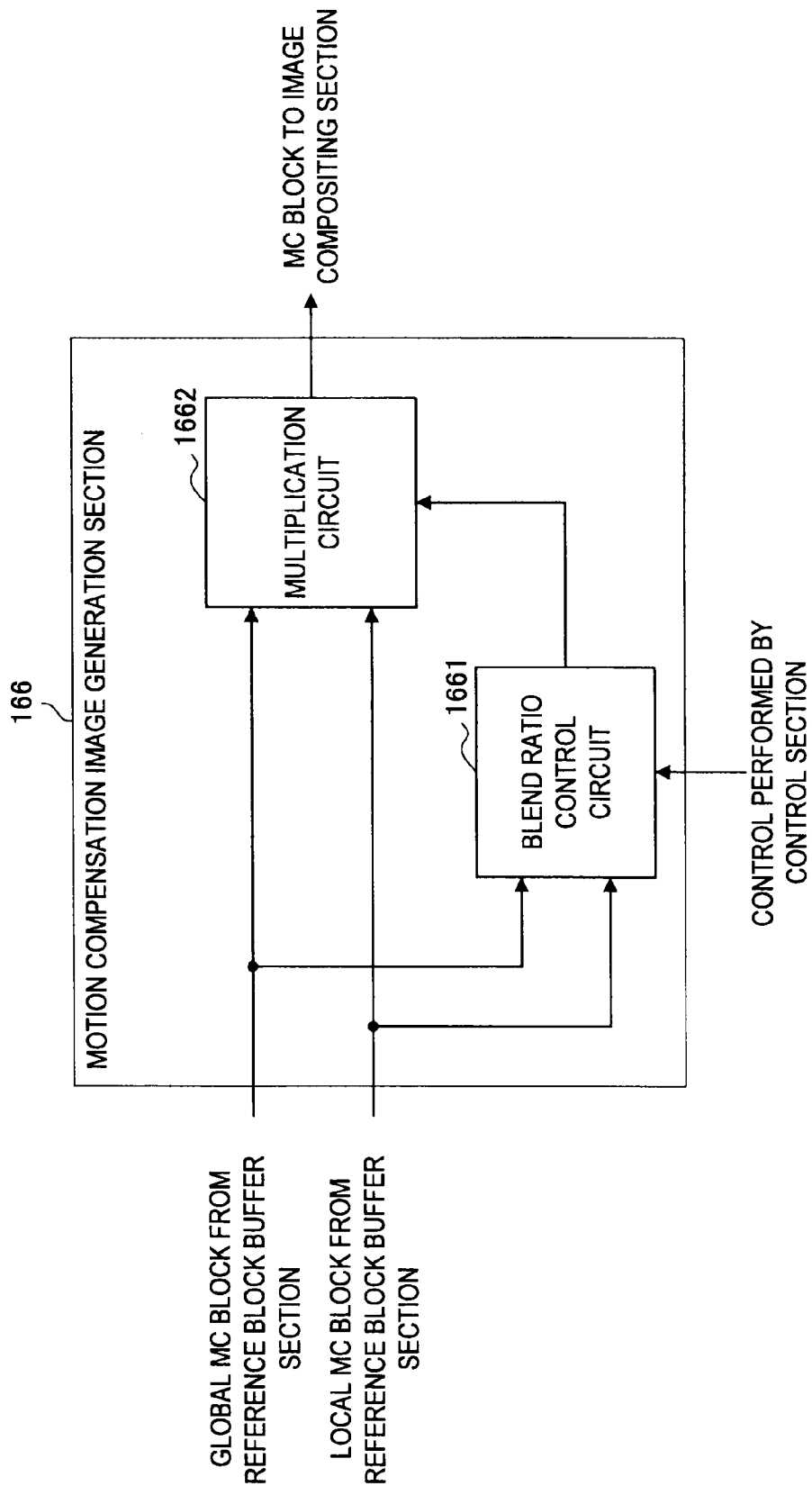
FIG. 10 is a block diagram showing a functional configuration of a motion compensation image generation section included in the motion compensation section of the imaging device according to the embodiment of the present disclosure.

Subsequently, with reference to FIG. 10, the motion compensation image generation section 166 will be described. FIG. 10 is a block diagram showing a functional configuration of the motion compensation image generation section 166 included in the motion compensation section 16 of the imaging device 10 according to the embodiment of the present disclosure. As shown in FIG. 10, the motion compensation image generation section 166 blends the global motion compensation block and the local motion compensation block, which are output from the reference block buffer section 162 at the same timing. The motion compensation image generation section 166 can generate a motion compensation image by performing such processing. Specifically, for example, by blending the global motion compensation block and the local motion compensation block based on the control by the control section 1, the motion compensation image generation section 166 can generate the motion compensation block for each target block.

The blend ratio of the global motion compensation block to the local motion compensation block is calculated in a blend ratio control circuit 1661, for example. The blend ratio control circuit 1661 calculates the blend ratio based on information indicating the motion of the imaging device 10, which is given by the control section 1 (such as CPU), for example. The blend ratio control circuit 1661 functions as an example of a blend ratio calculation section.

Note that, although the blend ratio control circuit 1661 calculates here the blend ratio of the global motion compensation block to the local motion compensation block, the blend ratio control circuit 1661 can also calculate the blend ratio of a first motion compensation image to a second motion compensation image, the first motion compensation image and the second motion compensation image being determined from a first motion vector and a second motion vector each indicating motion between frames, respectively. The first motion vector and the second motion vector used in this case are not particularly limited. As the first motion vector, there can be used a vector calculated for each block set within a frame. Further, as the second motion vector, there can be used a vector calculated for each frame. The local motion vector is an example of the vector calculated for each block set within a frame, and the global motion vector is an example of the vector calculated for each frame.

Further, the multiplication circuit 1662 adds the global motion compensation block to the local motion compensation block based on the blend ratio calculated by the blend ratio control circuit 1661. For example, in the case where the imaging device 10 is connected to a fixing member such as a tripod and shaking does not occur to the global motion vector, the ratio of the global MC block to be blended may be increased. On the other hand, in the case where the shaking of the shooter himself/herself is detected by an acceleration sensor, a gyro sensor, or the like, the ratio of the local MC block to be blended may be increased. The multiplication circuit 1662 functions as an example of a blend section.

In motion compensation, processing corresponding to each of the global motion and the local motion, that is, deformation processing that accompanies translation, rotation, and scaling with respect to the reference block, is performed, the global MC block and the local MC block obtained as a result thereof are blended, and thereby being able to generate the motion compensation image. From the motion compensation image generation section 166, the motion compensation block (motion compensation image) and the target block (target image) are output to the image compositing section 17.

(Details of Image Compositing Section)

Figure 11:
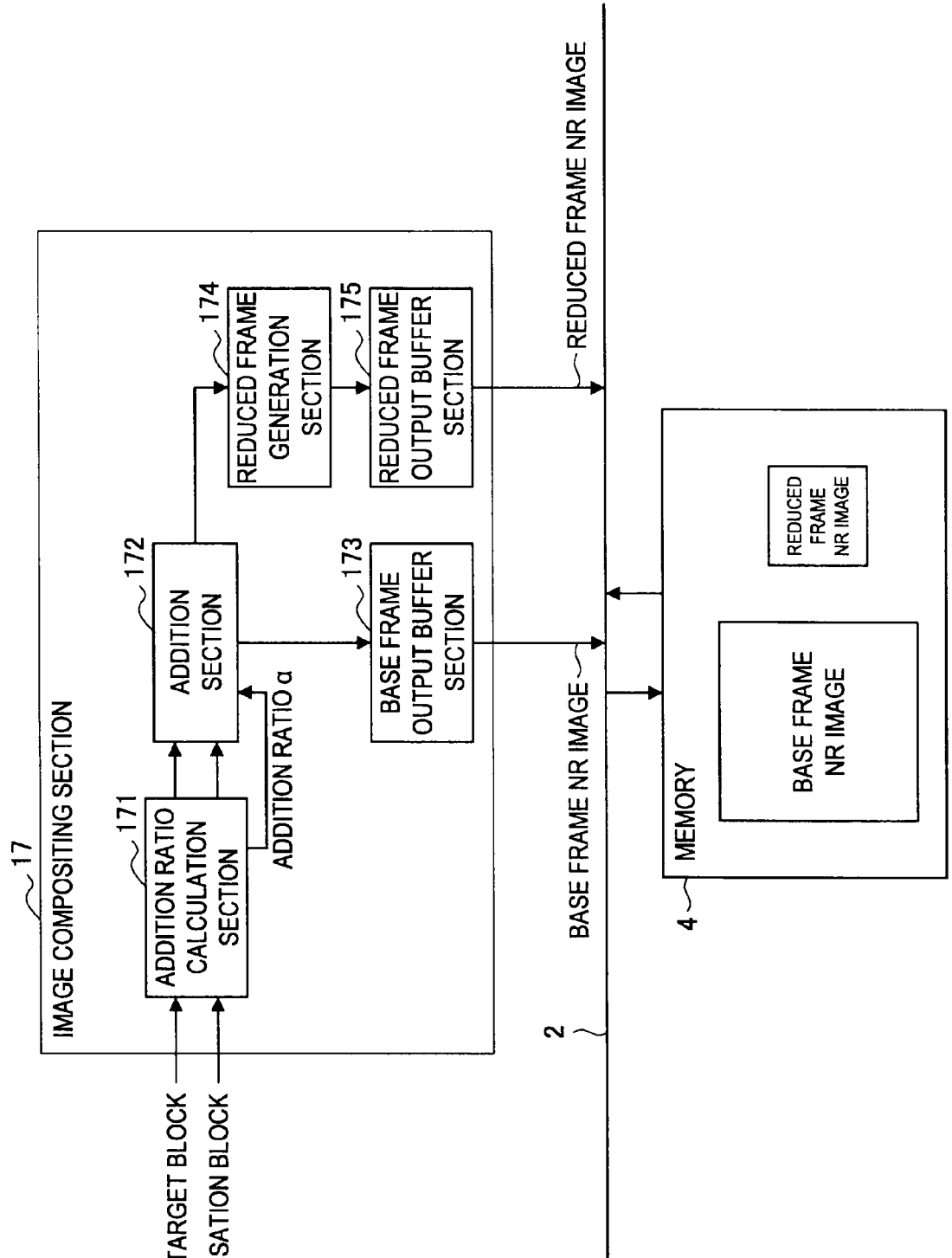
FIG. 11 is a is a block diagram showing a functional configuration of an image compositing section of the imaging device according to the embodiment of the present disclosure.

FIG. 11 is a block diagram showing a functional configuration of the image compositing section 17 of the imaging device 10 according to the embodiment of the present disclosure. Referring to FIG. 11, the image compositing section 17 includes an addition ratio calculation section 171, an addition section 172, a base frame output buffer section 173, a reduced frame generation section 174, and a reduced frame output buffer section 175. The image compositing section 17 including those sections may be realized using a DSP, for example.

The addition ratio calculation section 171 acquires the pixel data of a base frame target block and the pixel data of a motion compensation block from the motion compensation section 16, and calculates the addition ratio of those blocks. The addition may be performed to the base frame target block 201 and the motion compensation block using an addition method such as a simple addition method or an average addition method. The addition ratio calculation section 171 may calculate the addition ratio in accordance with the addition method. The addition ratio calculation section 171 provides the addition section 172 with the calculated addition ratio, the pixel data of the base frame target block 201, and the pixel data of the motion compensation block.

The addition section 172 acquires, from the addition ratio calculation section 171, the pixel data of the base frame target block, the pixel data of the motion compensation block, and the addition ratio of those blocks. The addition section 172 adds the pixel data of the base frame target block to the pixel data of the motion compensation block at the acquired addition ratio, thereby generating a base frame NR block with reduced noise owing to an advantageous effect of the frame NR. The addition section 172 provides the base frame output buffer section 173 and the reduced frame generation section 174 with the pixel data of the base frame NR block.

The base frame output buffer section 173 accumulates the pixel data of the base frame NR block provided by the addition section 172, and provides the memory 4 with the pixel data of the base frame NR block as a base frame NR image.

The reduced frame generation section 174 reduces the pixel data of the base frame NR block provided by the addition section 172, and generates pixel data of a reduced frame NR block. The reduced frame generation section 174 provides the reduced frame output buffer section 175 with the pixel data of the reduced frame NR block.

The reduced frame output buffer section 175 accumulates the pixel data of the reduced frame NR block provided by the reduced frame generation section 174, and stores in the memory 4 the pixel data of the reduced frame NR block as a reduced frame NR image. Here, the reduced frame NR image stored in the memory 4 may be used as a reduced frame target image, in the case where a reference image is further composited with the target image obtained after the frame NR at the time of shooting a still image, for example. Further, here, the reduced frame NR image stored in the memory 4 may be used as a reduced frame reference image, in the case where the frame NR is executed using the next frame as a target image at the time of shooting a moving image.

(Changes in Blend Ratio Viewed from Usage Example of Imaging Device)

Figure 12:
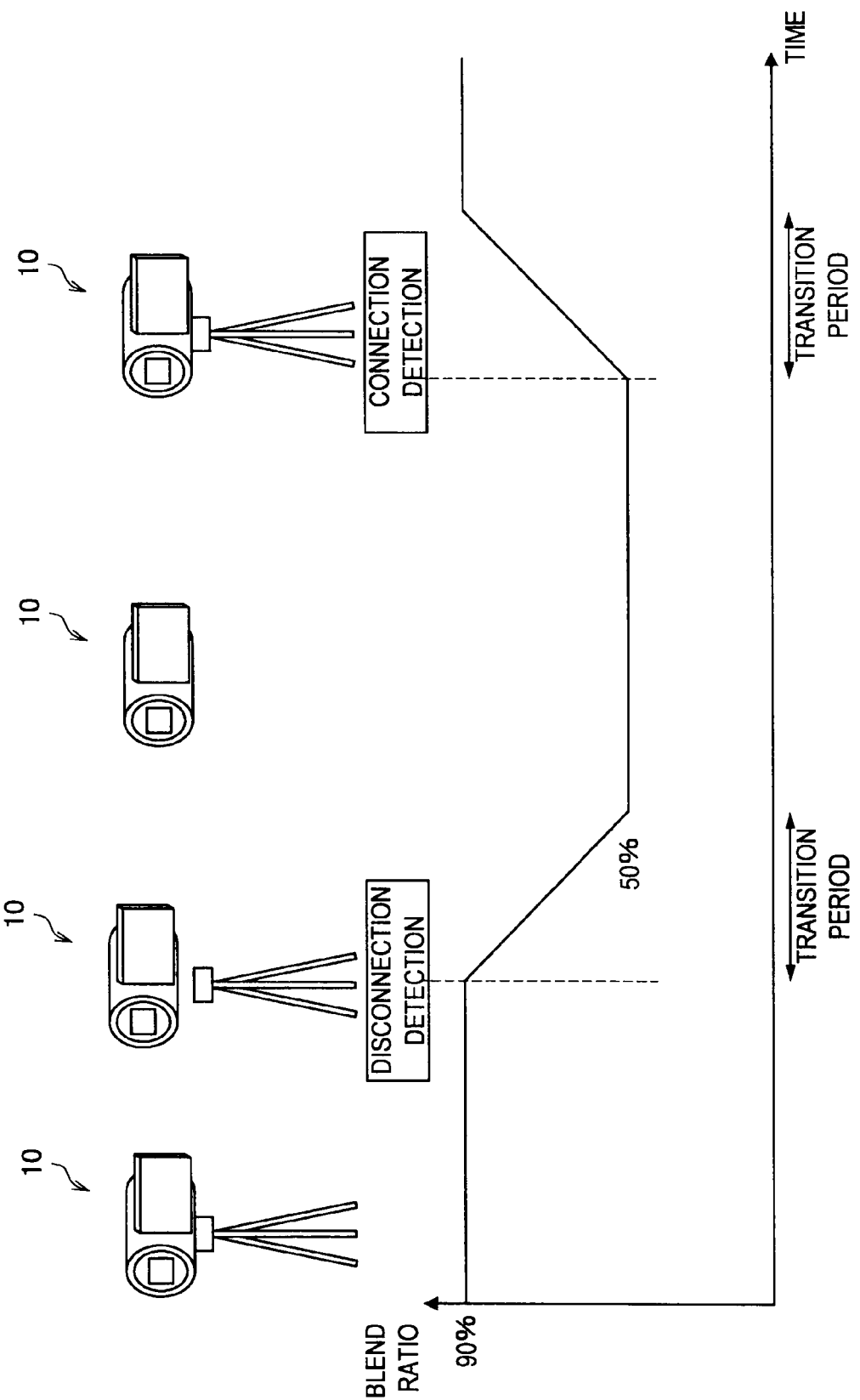
FIG. 12 is a diagram showing an example of change in a blend ratio during use of the imaging device according to the present embodiment.

Hereinafter, the ratio of the global motion compensation block in the motion compensation block is simply referred to as "blend ratio". FIG. 12 is a diagram showing an example of change in a blend ratio during use of the imaging device 10 according to the present embodiment. As shown in FIG. 12, when the imaging device 10 performs shooting, in the case where the imaging device 10 is connected to a fixing member, a high blend ratio can be set, because it is considered that less shaking occurs to the global motion vector. Further, when the imaging device 10 performs shooting, in the case where the fixing member is disconnected from the imaging device 10, the blend ratio can be decreased, because it is considered that shaking occurs to the global motion vector.

Further, when the imaging device 10 performs shooting, in the case where the imaging device 10 is connected to the fixing member, the blend ratio can be made high (can be increased again). The transition of the blend ratio from a high state to a low state, or the transition of the blend ratio from a low state to a high state is preferably performed slowly as shown in FIG. 12. This is for preventing the user's eyes from feeling uncomfortable by rapidly changing the blend ratio.

Figure 13:
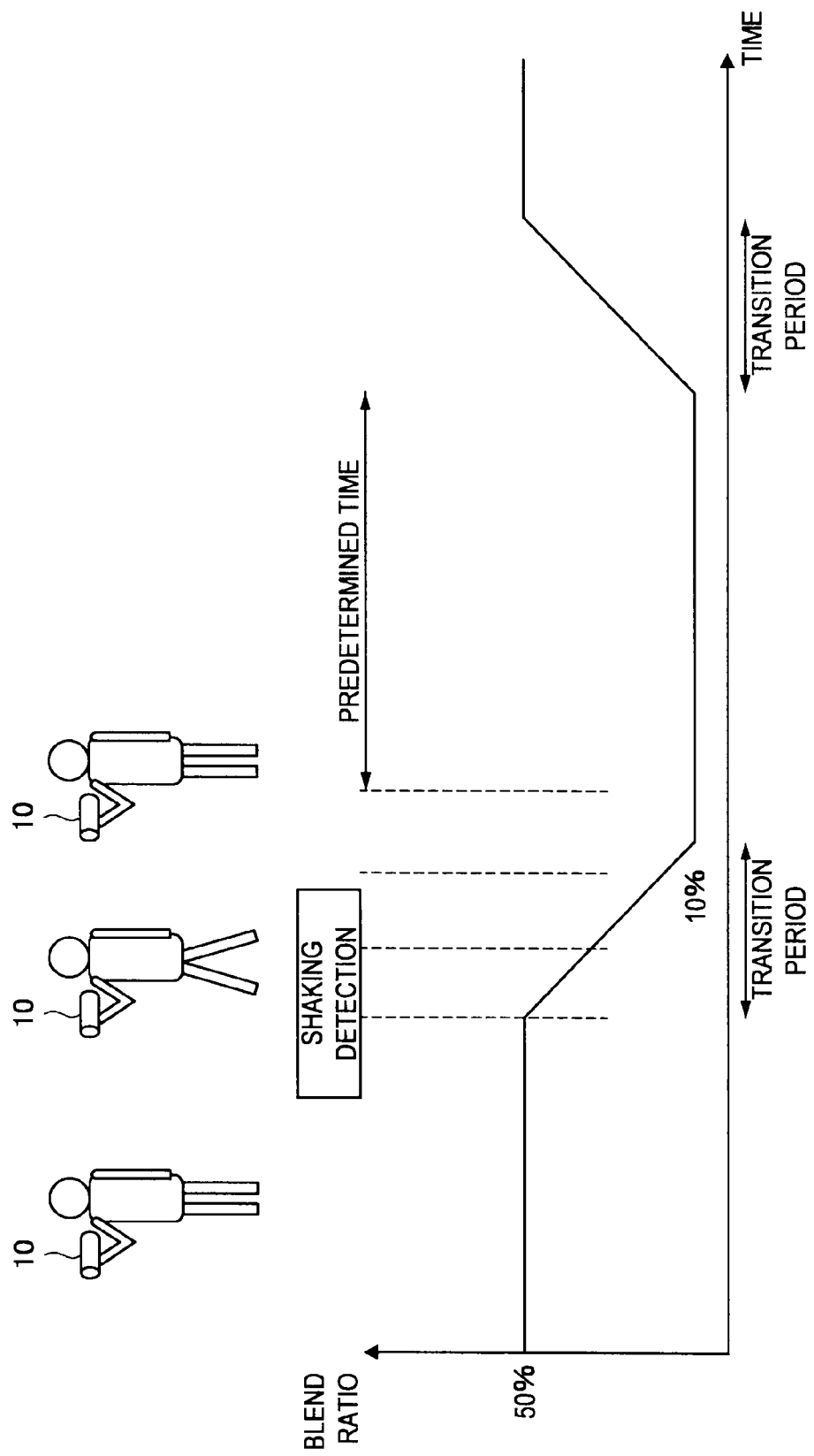
FIG. 13 is a diagram showing another example of change in the blend ratio during use of the imaging device according to the present embodiment.

FIG. 13 is a diagram showing another example of change in the blend ratio during use of the imaging device 10 according to the present embodiment. As shown in FIG. 13, when the imaging device 10 performs shooting, in the case where the shaking of the user's hand does not occur, a high blend ratio can be set, because it is considered that less shaking occurs to the global motion vector. Further, when the imaging device 10 performs shooting, in the case where the shaking of the user's hand occurs, the blend ratio can be decreased, because it is considered that shaking occurs to the global motion vector.

The transition of the blend ratio from a high state to a low state, or the transition of the blend ratio from a low state to a high state is preferably performed slowly as shown in FIG. 13. This is for preventing the user's eyes from feeling uncomfortable by rapidly changing the blend ratio. Further, as shown in FIG. 13, it is preferred that a predetermined time period be set from the point at which the blend ratio stops decreasing to the point at which the blend ratio starts increasing. This is because it is highly probable that the shaking of the user's hand occurs again immediately after the shaking of the user's hand once occurs.

(At Time of Shooting Moving Image)

Figure 14:
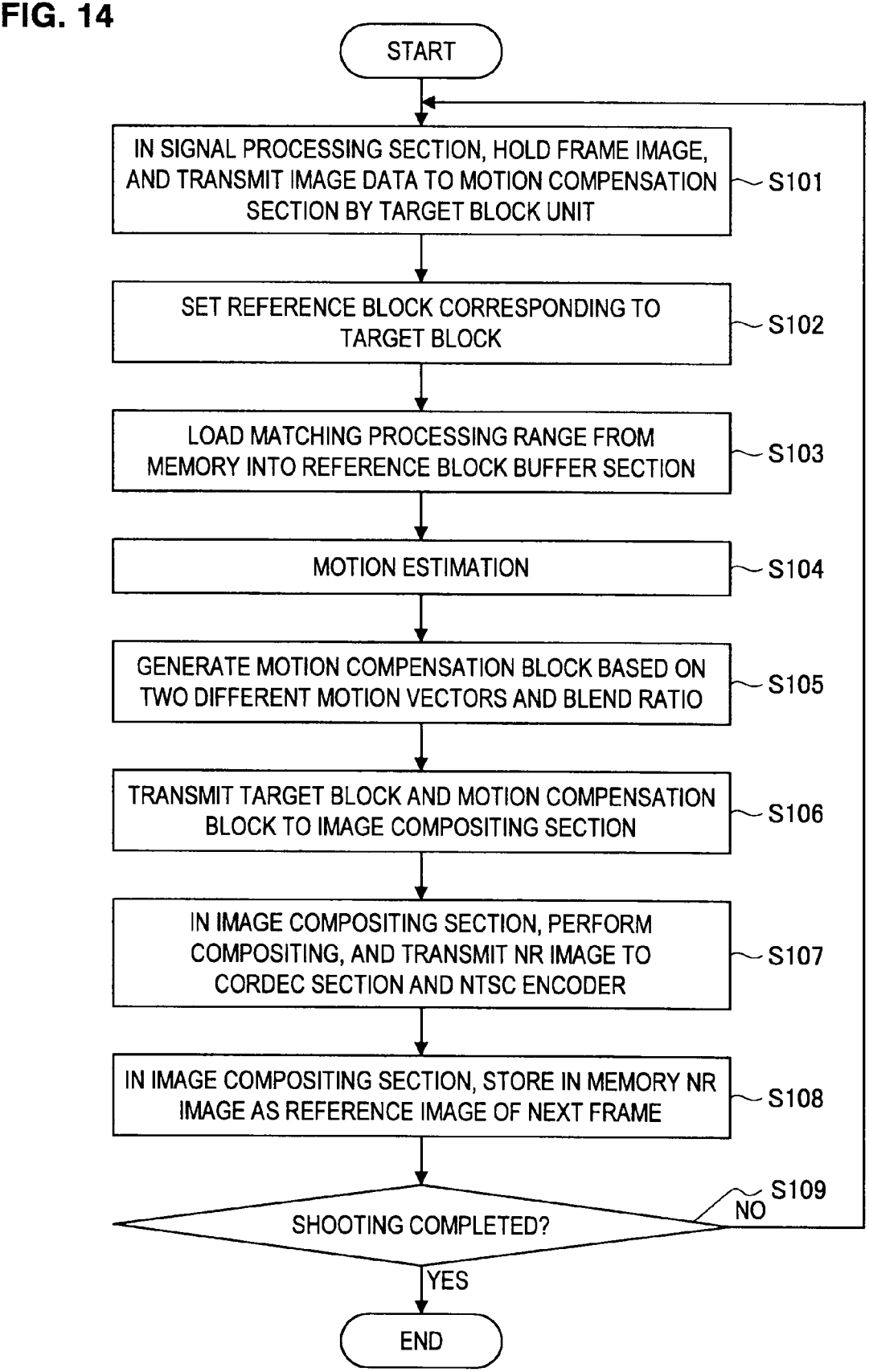
FIG. 14 is a flowchart showing noise reduction processing by image compositing at time of shooting a moving image performed by the imaging device according to the present embodiment.

Next, in FIG. 14, there is shown a flowchart of noise reduction processing by image compositing at time of shooting a moving image performed by the imaging device 10 according to the present embodiment. Each of the steps of the flowchart shown in FIG. 14 is executed under the control of the control section 1 and the controlling section 165 included in the motion compensation section 16 controlled by the control section 1. When a moving image-recording button is operated by the user, the control section 1 gives an instruction to start the processing of FIG. 14 from "START".

In the present embodiment, the motion compensation section 16 has a configuration suitable for performing matching processing on a per-target block basis. Accordingly, the signal processing section 13 holds a frame image and transmits image data to the motion compensation section 16 on a per-target block basis in accordance with the control performed by the control section 1 (Step S101).

The image data of the target block transmitted to the motion compensation section 16 is stored in the target block buffer section 161. Next, the controlling section 165 sets a reference block corresponding to the target block (Step S102), and loads the image data of the matching processing range from the memory 4 into the reference block buffer section 162 (Step S103).

Next, the matching processing section 163 and the motion vector calculation section 164 performs motion estimation processing by stage-by-stage block matching according to the present embodiment (Step S104). That is, the matching processing section 163 firstly calculates the SAD value between the pixel value of the reduced frame target block and the pixel value of the reduced frame reference block in the reduced frame, and transmits the calculated SAD value to the motion vector calculation section 164. The matching processing section 163 repeats the processing for all reduced frame reference blocks within the search range. After the calculation of the SAD values for all the reduced frame reference blocks within the search range is completed, the motion vector calculation section 164 specifies the minimum SAD value and estimates a reduced frame motion vector.

The controlling section 165 multiplies the reduced frame motion vector estimated by the motion vector calculation section 164 by the reciprocal of the reduction ratio, thereby converting the reduced frame motion vector into the motion vector on the base frame, and sets, as a search range on the base frame, the range having as a center a position that the converted vector indicates on the base frame. Then, the controlling section 165 performs control such that the matching processing section 163 performs block matching processing in the base frame within the search range. The matching processing section 163 calculates the SAD value between the pixel value of the base frame target block and the pixel value of the base frame reference block, and transmits the calculated SAD value to the motion vector calculation section 164.

After the calculation of the SAD values for all the reduced frame reference blocks within the search range is completed, the motion vector calculation section 164 specifies the minimum SAD value and estimates a reduced frame motion vector. The motion vector calculation section 164 also specifies SAD values which are placed in the vicinity thereof, performs the quadratic curve approximate interpolation processing described above using those SAD values, and outputs a motion vector with high sub-pixel accuracy.

Next, in accordance with the highly accurate motion vector calculated in Step S104, the controlling section 165 reads out image data of two motion compensation blocks (local motion compensation block and global motion compensation block) from the reference block buffer section 162, and generates a motion compensation block by blending the local motion compensation block and the global motion compensation block based on two different motion vectors and the blend ratio (Step S105). The controlling section 165 synchronizes the generated motion compensation block with the target block, and transmits them to the image compositing section 17 of the following stage (Step S106).

In the image compositing section 17, the compositing of the target block and the motion compensation block is performed. The image compositing section 17 outputs the image data of the NR image obtained as a result of the compositing to the display 6 through the NTSC encoder 20, thereby performing moving image recording monitoring, and also transmits the image data of the NR image to the storage 5 through the moving image codec 19 to be recorded in a recording medium (Step S107).

The image composited in the image compositing section 17 is stored in the memory 4 again, and is used as a reference frame in the next frame (target frame) (Step S108).

After that, the control section 1 determines whether moving image recording-stop operation is performed by the user (Step S109), and in the case where it is determined that the moving image recording-stop operation is not performed by the user, the processing returns to Step S101, and the control section 1 gives an instruction to repeat the processing from Step S101 onward. Further, in the case where it is determined in Step S109 that the moving image recording-stop operation is performed by the user, the control section 1 terminates the processing routine.

In the processing routine of the noise reduction processing of the moving image described above, the one-frame-preceding image frame is used as the reference frame, but an image of further preceding frame may also be used as the reference frame. Further, the one-frame-preceding image and the two-frame-preceding image may be stored in the memory 4, and which of the image frames is to be used as the reference frame may be selected based on the contents of the two pieces of image information.

By using the above-mentioned means, procedure, and system configuration, it becomes possible to perform the still image noise reduction processing and the moving image noise reduction processing in the same hardware for block matching processing.

(Flow of Processing of Motion Compensation Block Creation)

Figure 15:
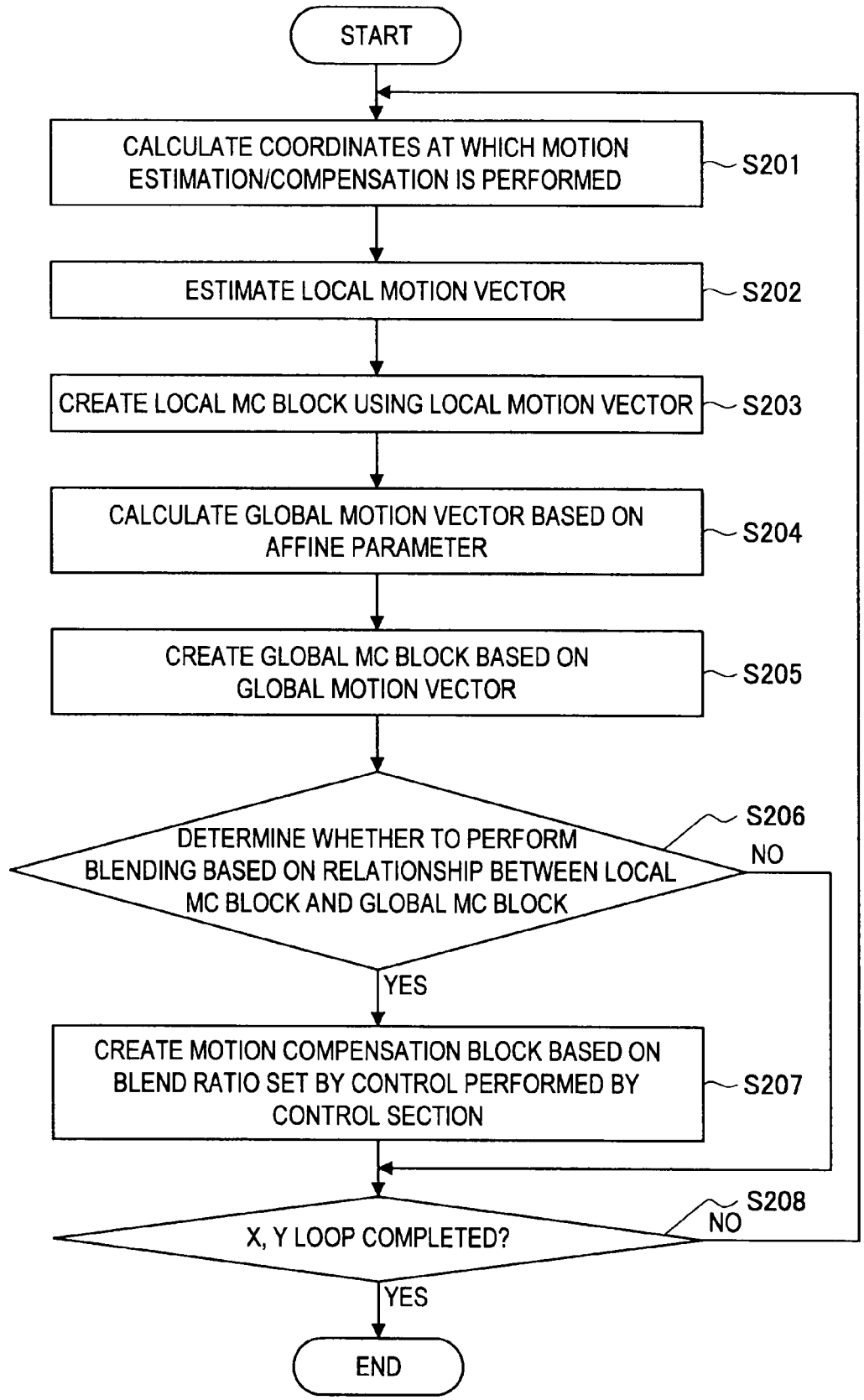
FIG. 15 is a flowchart showing a flow of processing of motion compensation block creation executed by the imaging device according to the present embodiment.

Next, FIG. 15 shows a flow of processing of motion compensation block creation executed by the imaging device 10 according to the present embodiment. As shown in FIG. 15, the motion vector calculation section 164 calculates coordinates at which motion estimation/compensation is performed (Step S201), and estimates a local motion vector (Step S202). The motion compensation image generation section 166 creates a local MC block using the local motion vector estimated by the motion vector calculation section 164 (Step S203). On the other hand, the motion vector calculation section 164 calculates a global motion vector in accordance with the local motion vector estimated by the motion vector calculation section 164 based on an affine parameter (Step S204).

The motion compensation image generation section 166 creates a global MC block based on the global motion vector (Step S205), and determines whether to perform blending of the local MC block and the global MC block based on the relationship between the local MC block and the global MC block (Step S206). In the case where the motion compensation image generation section 166 determines not to perform the blending of the local MC block and the global MC block, the processing proceeds to Step S208. On the other hand, in the case where the motion compensation image generation section 166 determines to perform the blending of the local MC block and the global MC block, the motion compensation image generation section 166 creates a motion compensation block based on a blend ratio set by the control performed by the control section 1 (Step S207), and the processing proceeds to Step S208.

When the processing proceeds to Step S208, the motion vector calculation section 164 determines whether X,Y loop is completed (Step S208), and in the case where the motion vector calculation section 164 determines that the X,Y loop is not completed, the processing returns to Step S201 in order to calculate the next X and Y coordinates as coordinates to perform the motion estimation/compensation. In the case where the motion vector calculation section 164 determines that the X,Y loop is completed, the processing of the motion compensation block creation is completed.

The motion compensation image generation section 166 can blend the local MC image (LMC) and the global MC image (GMC) on a per-pixel basis, and can output an MC image, in order to enhance the accuracy of the MC image obtained as a generation result. The motion compensation image generation section 166 can calculate a weighting factor (GMC_W) for the blending based on moving object-determination and LMV-reliability.

That is, the followings are performed.

When the difference between LMC and GMC is large, LMC is used since it is a moving part.

When the LMV-reliability is low, the blend ratio of GMC is increased.

(Low LMV-reliability=difference between minimum value and second minimum value of SAD is small, or distribution of peripheral LMV is large)

When blending Cb and Cr, LMC and GMC are each determined using luminance (Y signal).

The LMV-reliability determination can be performed using the following determination formula, for example.

If((second minimum value of SAD table at block matching−minimum SAD value at block matching<=SAD_TH)|| (LMV difference absolute value MAX>LMV_THR))

LMV-reliability is low;

Calculation formula for difference: For MV1 and MV2, |MV1−MV2|=|MV1.x-MV2.x|+|MV1.y-MV2.y|

The determination of the blend ratio between GMC and LMC can be performed using the following determination formula, for example.

```
If(difference between LMC and GMC > GMC_DIFF_THR){
    GMC_W=0;
            //(LMC is used as imaging device 10 is moving.   GMC is not blended)
    else If(LMV-reliability is low)
        GMC_W=GMC_W_L;
    else
        GMC_W=GMC_W_S;
}
```

Figures 16, 17:
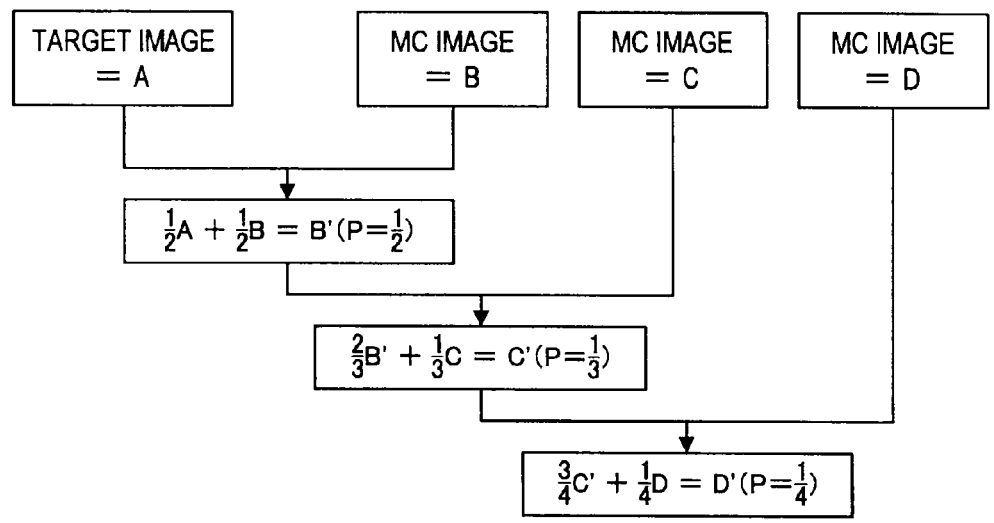
FIG. 16 is a diagram showing a global motion vector and a GMC blend ratio for each operation mode during use of the imaging device according to the present embodiment.
FIG. 17 is a diagram illustrating an example of compositing of a target image and a motion compensation image according to the embodiment of the present disclosure.

FIG. 16 is a diagram showing a global motion vector and a GMC blend ratio for each operation mode during use of the imaging device according to the present embodiment. The operation mode "normal shooting" represents a state in which the imaging device 10 is not fixed, and the operation mode "fixed shooting" represents a state in which the imaging device 10 is fixed. Those states are determined based on the motion of the imaging device 10 detected by the detection section 7.

As shown in FIG. 16, in the case where the operation mode is "normal shooting", the global motion vector is calculated on a real-time basis (for example, two-frame delay), and in the case where the operation mode is "fixed shooting", the global motion vector is not newly calculated. Further, in the case where the operation mode is "normal shooting", the GMC blend ratio is calculated in accordance with shaking, and in the case where the operation mode is "fixed shooting", the GMC blend ratio is set to a high value.

(Flow of Addition Ratio Calculation Processing)

In the present embodiment, the addition ratio calculation section 171 calculates an addition ratio α ($0 \leq α \leq 1$) on a per-pixel basis. Then, as described above, basically, the addition ratio α is calculated in accordance with the difference on a per-pixel basis between the target image and the motion compensation image, and the hit ratio β. Accordingly, the hit ratio β, and target image data TGv and motion compensation image data MCv are supplied to the addition ratio calculation section 171.

Here, when the difference on a per-pixel basis between the target image and the motion compensation image is large, it is considered to be a moving part, and hence, the addition ratio α is to be decreased, but when there is no the difference on a per-pixel basis or the difference on a per-pixel basis is small, the addition ratio α may be set high. However, in the case where it is not clear whether the target block is a background still image part or a moving subject-of-shooting part, it is necessary as described above to suppress the addition ratio α to a relatively low value, in order that the double exposure on the moving part does not become remarkable.

However, in the present embodiment, since the degree of correspondence as the background still image part is determined based on the hit ratio β, the addition ratio α is set to be high with increase in the hit ratio β and increase in the degree of correspondence of background.

Further, in the present embodiment, since the noise included in the image depends on brightness of a shooting scene (gain amount of image), as for the difference on a per-pixel basis between the target image and the motion compensation image, the addition ratio calculation section 171 considers the noise which depends on the brightness of the shooting scene (gain amount of image). That is, when the difference on a per-pixel basis between the target image and the motion compensation image is within the range of the noise, it is determined that the actual difference between the two is small. Further, when the difference on a per-pixel basis is larger than the range of the noise, it is determined that the difference between the two is actually large.

(Details of Addition Processing)

As described above, the addition section 172 uses the addition ratio α, and generates the NR image by compositing the motion compensation image on the target image for each pixel. Here, there are assumed various techniques for the compositing using the addition ratio α performed by the addition section 172. FIG. 17 is a diagram illustrating an example of compositing of a target image and a motion compensation image.

FIG. 17 shows an example of generating an image after the compositing, by compositing a motion compensation image B on a target image A, compositing a motion compensation image C on an image B' generated by the compositing, and compositing a motion compensation image D on an image C' generated by the compositing. However, the number of motion compensation images to be composited on the target image may be other than three, and is not particularly limited as long as it is one or more.

As shown in FIG. 17, the number of times of compositing can be increased, and at the same time, the motion compensation images can be added one after another while decreasing the value of P in the order of "½", "⅓", "¼", . . . . That is, in the case where the number of times of compositing is set to n times, the addition of the motion compensation images is performed by setting the value of P to "1/n−1". With such addition, all of the target image and the motion compensation images can be added with equal weighting.

2. Summary

In the embodiment of the present disclosure, in the image processing device taking account of a global motion vector, it is possible to obtain stable NR effects regardless of variation in reliability of the global motion vector, and also to avoid the occurrence of unnatural NR effects even in the case where the global motion vector changes rapidly. Further, at the time of shooting a moving image, the amount of resource for determining the global ME and the local ME on a real-time basis can be reduced.

It should be understood by those skilled in the art that various modifications, combinations, sub-combinations and alterations may occur depending on design requirements and other factors insofar as they are within the scope of the appended claims or the equivalents thereof.

For example, in the embodiment of the present disclosure, although the description has been made on the frame NR having motion estimation/motion compensation functions, the embodiment of the present disclosure can be also applied to other frame NR. For example, it is considered that there are basically the following types in the frame NR.

1. Motion compensation using local ME on a per-block basis+frame NR
2. Motion compensation using global ME on a per-screen basis+frame NR
3. Frame NR using frame image that precedes frame image without motion compensation (i.e., motion 0)

The embodiment of the present disclosure suggests the frame NR taking account of two types of motion compensation images, such as motion compensation using local ME on a per-block basis+motion compensation using global ME on a per-screen basis. In the case of using those two types of motion compensation images, it is desirable that: first, the two motion compensation images are compared with each other; next, variations in adjacent vectors are considered; and finally, the two types of the motion compensation images are blended based on the motion information of the imaging device 10 itself.

This technology can be applied to other combinations, such as the followings.

1. Motion compensation using local ME on a per-block basis+frame image that precedes frame image with motion 0
2. Motion compensation using global ME on a per-screen basis+frame image that precedes frame image with motion 0

Further, the technology may be combined with information of the outside of the imaging device 10, such as optical shaking. Further, the technology may be combined with three or more types of motion estimation.

For example, in the embodiments described above, the imaging device is exemplified as the image processing device, but the present disclosure is not limited to such an example. For example, the image processing device may be an independent device that is used for processing image data which is being stored, or may be embedded, as an application for processing image data, in an information processing device such as a PC (Personal Computer).

Further, in the embodiments described above, the case has been exemplified in which the functions of the motion compensation section and the image compositing section included in the image processing device are each realized using the DSP, but the present disclosure is not limited to such an example. For example, the functions of the respective sections may each be realized by dedicated hardware, or may each be realized as software by using a CPU.

The present disclosure contains subject matter related to that disclosed in Japanese Priority Patent Application JP 2011-000350 filed in the Japan Patent Office on Jan. 5, 2011, the entire content of which is hereby incorporated by reference.

What is claimed is:

1. An image processing device comprising:
   a detection section which detects motion of the image processing device;
   a blend ratio calculation section which calculates a blend ratio of a first motion compensation image to a second motion compensation image, the first motion compensation image and the second motion compensation image being determined from a first motion vector and a second motion vector each indicating motion between frames, respectively, based on the motion of the image processing device detected by the detection section;
   a blend section which generates a motion compensation image by blending the first motion compensation image and the second motion compensation image in accordance with the blend ratio calculated by the blend ratio calculation section; and
   an addition section which adds the motion compensation image generated by the blend section to a target image, wherein the detection section detects the motion of the image processing device by detecting connection of a fixing member to the image processing device.

2. The image processing device according to claim 1, wherein the second motion compensation image is a motion compensation image determined based on a frame obtained by being delayed one frame or more with respect to a frame used for determining the first motion compensation image.

3. The image processing device according to claim 1, wherein the first motion vector is a vector calculated for each block set within each frame.

4. The image processing device according to claim 1, wherein the second motion vector is a vector calculated for each frame.

5. The image processing device according to claim 1, wherein the detection section detects the motion of the image processing device by detecting movement of the image processing device.

6. An image processing method comprising:
   detecting motion of an image processing device by detecting connection of a fixing member to the image processing device;
   calculating a blend ratio of a first motion compensation image to a second motion compensation image, the first motion compensation image and the second motion compensation image being determined from a first motion vector and a second motion vector each indicating motion between frames, respectively, based on the motion of the image processing device;
   generating a motion compensation image by blending the first motion compensation image and the second motion compensation image in accordance with the blend ratio; and
   adding the motion compensation image to a target image.

7. The image processing method according to claim 6, wherein the second motion compensation image is a motion compensation image determined based on a frame obtained by being delayed one frame or more with respect to a frame used for determining the first motion compensation image.

8. The image processing method according to claim 6, wherein the first motion vector is a vector calculated for each block set within each frame.

9. The image processing method according to claim 6, wherein the second motion vector is a vector calculated for each frame.

10. The image processing method according to claim 6, further comprising detecting the motion of the image processing device by detecting movement of the image processing device.

* * * * *